United States Patent
Wang et al.

(10) Patent No.: US 12,349,093 B2
(45) Date of Patent: Jul. 1, 2025

(54) TIMING OFFSET PARAMETER UPDATE METHOD, DEVICE, AND SYSTEM

(71) Applicant: HUAWEI TECHNOLOGIES CO., LTD., Shenzhen (CN)

(72) Inventors: Xiaolu Wang, Hangzhou (CN); Hejia Luo, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 18/182,885

(22) Filed: Mar. 13, 2023

(65) Prior Publication Data

US 2023/0224843 A1  Jul. 13, 2023

Related U.S. Application Data

(63) Continuation of application No. PCT/CN2021/101622, filed on Jun. 22, 2021.

(30) Foreign Application Priority Data

Sep. 11, 2020  (CN) .......................... 202010956520.5

(51) Int. Cl.
*H04W 56/00* (2009.01)
(52) U.S. Cl.
CPC ..... *H04W 56/005* (2013.01); *H04W 56/0015* (2013.01)
(58) Field of Classification Search
CPC ........... H04W 56/005; H04W 56/0015; H04W 56/0045; H04B 7/2656; H04B 7/1851; H04B 7/18563
See application file for complete search history.

(56) References Cited

U.S. PATENT DOCUMENTS

| | | | | |
|---|---|---|---|---|
| 2001/0050925 A1* | 12/2001 | Mesiwala | .................. | H04L 9/40 370/352 |
| 2015/0271675 A1* | 9/2015 | Cheng | .................. | H04W 12/106 455/410 |
| 2023/0199688 A1* | 6/2023 | Wang | ................ | H04W 56/0045 370/503 |

OTHER PUBLICATIONS

Huawei et al., "Discussion on timing relationship enhancements for NTN," 3GPP TSG RAN WG1 Meeting #102-e, R1-2005265, 3rd Generation Partnership Project (3GPP), Mobile Competence Centre; 650, Route Des Lucioles; F-06921 Sophia-Antipolis Cedex; France, XP052346642, Total 6 pages (Aug. 17-18, 2020).

* cited by examiner

*Primary Examiner* — Ashley Shivers
(74) *Attorney, Agent, or Firm* — Leydig, Voit & Mayer, Ltd.

(57) ABSTRACT

A timing offset parameter update method, a device, and a system are provided, which relate to the field of communication technologies, to help reduce signaling overhead generated when a network device updates a value of a timing offset parameter. The method includes: a terminal device obtains first information that includes a first reference value and first indication information, wherein the first indication information indicates an update rule of a timing offset parameter, and the first reference value is an initial value of the timing offset parameter. The terminal device updates a value of the timing offset parameter based on the first information and a timing offset variation, to obtain an updated value of the timing offset parameter, wherein an absolute value of the timing offset variation is equal to an absolute value of a difference between any two consecutively updated values of the timing offset parameter.

16 Claims, 10 Drawing Sheets

(a)

(b)

TIMING OFFSET PARAMETER UPDATE METHOD, DEVICE, AND SYSTEM

CROSS-REFERENCE TO RELATED APPLICATIONS

This application is a continuation of International Application No. PCT/CN2021/101622, filed on Jun. 22, 2021, which claims priority to Chinese Patent Application No. 202010956520.5, filed on Sep. 11, 2020. The disclosures of the aforementioned applications are hereby incorporated by reference in their entireties.

TECHNICAL FIELD

Embodiments of the present application relate to the field of communication technologies, and in particular, to a timing offset parameter update method, a device, and a system.

BACKGROUND

In an existing communication system, non-terrestrial networks (NTNs) are introduced to places such as a sea, a desert, or the air in which a base station cannot be deployed. Base station functions or a part of base station functions are deployed on a flight platform such as a satellite to form a network device, to provide seamless coverage for a terminal device. This improves reliability of the communication system.

In the NTN, because a distance between the network device and the terminal device is long, a round trip delay (RTD) corresponding to the terminal device is large. To avoid interference between different terminal devices in a cell, the network device may send a timing advance (TA) adjustment amount to the terminal device based on the round trip delay corresponding to the terminal device. In this case, after receiving a downlink signal, the terminal device sends an uplink signal in advance based on the timing advance adjustment amount. The timing advance adjustment amount of the terminal device is less than or equal to the round trip delay corresponding to the terminal device.

In addition, a timing offset parameter is introduced, to avoid a case in which the terminal device cannot send the uplink signal based on the timing advance adjustment amount because a preset delay between a time point at which the terminal device receives the downlink signal and a time point at which the terminal device feeds back the uplink signal is less than the timing advance adjustment amount. The network device sends a value of the timing offset parameter to the terminal device, so that the terminal device has sufficient time to perform timing advance adjustment based on the preset delay and the value of the timing offset parameter after receiving the downlink signal. The value of the timing offset parameter is greater than or equal to the timing advance adjustment amount.

Because the network device in the NTN has mobility, as the network device continuously moves, the distance between the network device and the terminal device continuously changes, and the round trip delay of the terminal device also changes accordingly. The network device may adjust the timing advance adjustment amount of the terminal device based on the round trip delay of the terminal device. In addition, the network device may also update the value of the timing offset parameter based on the round trip delay of the terminal device, to avoid a large scheduling delay corresponding to the terminal device due to an excessively large value of the timing offset parameter and avoid reducing transmission efficiency.

However, when the network device continuously updates the value of the timing offset parameter in a running process, the network device needs to continuously configure an updated value of the timing offset parameter for the terminal device by using signaling. Consequently, signaling overheads of the network device are high.

SUMMARY

In view of this, an objective of this application is to provide a timing offset parameter update method, a device, and a system, to help reduce signaling overheads generated when a network device updates a value of a timing offset parameter.

According to a first aspect, an embodiment of this application provides a timing offset parameter update method. The method includes: A terminal device obtains first information that includes a first reference value and first indication information, where the first indication information indicates an update rule of a timing offset parameter, and the first reference value is an initial value of the timing offset parameter. The terminal device updates a value of the timing offset parameter based on the first information and a timing offset variation, to obtain an updated value of the timing offset parameter, where an absolute value of the timing offset variation is equal to an absolute value of a difference between any two consecutively updated values of the timing offset parameter.

Based on the first aspect, the terminal device may automatically update the value of the timing offset parameter according to the update rule of the timing offset parameter indicated by the first indication information and based on the first reference value and the timing offset variation, and a network device does not need to continuously update the value of the timing offset parameter and deliver the value to the terminal device by using signaling. Therefore, signaling overheads of the network device are reduced.

In a possible design, the first indication information includes the update rule, and the update rule includes at least one of the following: increasing the value of the timing offset parameter, or decreasing the value of the timing offset parameter; the first indication information includes a second reference value, and when the second reference value is greater than the first reference value, the first indication information indicates to increase the value of the timing offset parameter; or when the second reference value is less than the first reference value, the first indication information indicates to decrease the value of the timing offset parameter; or the first indication information includes a difference between a second reference value and the first reference value, and when the second reference value is greater than the first reference value, the first indication information indicates to increase the value of the timing offset parameter; or when the second reference value is less than the first reference value, the first indication information indicates to decrease the value of the timing offset parameter.

Based on this possible design, the first indication information may indicate the update rule of the timing offset parameter in an explicit indication manner. For example, the terminal device is directly indicated to increase the value of the timing offset parameter or decrease the value of the timing offset parameter. Alternatively, the first indication information may indicate the update rule of the timing offset parameter in an implicit indication manner. For example, the second reference value or the difference between the second reference value and the first reference value is indicated to the terminal device, to implicitly indicate the terminal device to update the value of the timing offset parameter toward a direction of the second reference value. This provides a feasible solution for the first indication information to indicate the update rule of the timing offset parameter.

In a possible design, the terminal device obtains second information, where the second information includes one or more of the following: a first moment, an update interval, an update moment, or a quantity of update times, the first moment indicates a moment at which the terminal device starts to update the value of the timing offset parameter, the update interval indicates a time interval between any two consecutive times of updating the value of the timing offset parameter by the terminal device, the update moment indicates a start moment at which the terminal device updates the value of the timing offset parameter, and the quantity of update times indicates a quantity of times that the terminal device updates the value of the timing offset parameter.

Based on this possible design, the network device sends the first moment to the terminal device, so that the terminal device and the network device can start to update the value of the timing offset parameter at a same moment. The network device sends the update interval to the terminal device, so that the terminal device and the network device can update the value of the timing offset parameter at a same time interval. The network device sends the update moment to the terminal device, so that the terminal device and the network device can update the value of the timing offset parameter at a same moment. The network device sends the quantity of update times to the terminal device, so that the terminal device and the network device can update the value of the timing offset parameter by using a same quantity of update times. The terminal device updates the value of the timing offset parameter based on the second information, so that it can be ensured that the value that is of the timing offset parameter corresponding to the terminal device and that is updated on a terminal device side is consistent with the value that is of the timing offset parameter corresponding to the terminal device and that is updated on a network device side.

In a possible design, the terminal device obtains second indication information indicating the terminal device to stop updating the value of the timing offset parameter, and the terminal device stops updating the value of the timing offset parameter based on the second indication information.

In a possible design, when the first indication information includes the second reference value or the difference between the second reference value and the first reference value, the terminal device determines whether an absolute value of a difference between the updated value of the timing offset parameter and the second reference value is less than or equal to a first threshold; and if the absolute value of the difference between the updated value of the timing offset parameter and the second reference value is less than or equal to the first threshold, stops updating the value of the timing offset parameter.

Based on the foregoing two possible designs, the terminal device may stop updating the value of the timing offset parameter based on the explicit second indication information sent by the network device. Alternatively, the terminal device may implicitly determine, based on the first indication information that is sent by the network device and that includes the second reference value or the difference between the second reference value and the first reference value, that when the absolute value of the difference between the updated value of the timing offset parameter and the second reference value is less than or equal to the first threshold, the terminal device stops updating the value of the timing offset parameter.

In a possible design, after the absolute value of the difference between the updated value of the timing offset parameter and the second reference value is less than or equal to the first threshold, the terminal device updates the updated value of the timing offset parameter based on the timing offset variation until an absolute value of a difference between an updated value of the timing offset parameter and the first reference value is less than or equal to a second threshold.

Based on this possible design, the terminal device may update, based on the timing offset variation, the value of the timing offset parameter from the first reference value to the second reference value, and then update the value of the timing offset parameter from the second reference value to the first reference value. This is not limited.

In a possible design, the terminal device obtains third indication information indicating the terminal device to update the value of the timing offset parameter; and the terminal device updates the value of the timing offset parameter based on the third indication information.

In a possible design, the terminal device sends, to the network device, fourth indication information indicating to update the value of the timing offset parameter, so that the network device updates, based on the fourth indication information, the value of the timing offset parameter corresponding to the terminal device.

Based on the foregoing two possible designs, the terminal device may update the value of the timing offset parameter based on the third indication information sent by the network device, or may send the fourth indication information to the network device, to indicate the network device to update the value of the timing offset parameter corresponding to the terminal device. This is not limited.

In a possible design, when the terminal device is located in a first area, the terminal device obtains first information corresponding to the first area; and when the terminal device hands over from the first area to a second area, the terminal device obtains first information corresponding to the second area, where the first area is a coverage area of a first beam, a first cell, or a first terminal device group, and the second area is a coverage area of a second beam, a second cell, or a second terminal device group.

Based on this possible design, when the terminal device is located in the first area, the terminal device may update the value of the timing offset parameter based on the first information corresponding to the first area. When the terminal device moves from the first area to the second area, the terminal device may update the value of the timing offset parameter based on the first information corresponding to the second area. The network device broadcasts different first information to different areas, so that terminal devices in a same area can automatically update the value of the timing offset parameter based on same first information, and signaling overheads for sending the first information by the network device can also be reduced.

According to a second aspect, an embodiment of this application provides a terminal device. The terminal device may implement a function performed by the terminal device in the first aspect or the possible designs of the first aspect, and the function may be implemented by hardware executing corresponding software. The hardware or the software includes one or more modules corresponding to the foregoing function, for example, a transceiver module and a processing module. The transceiver module is configured to obtain first information that includes a first reference value and first indication information, where the first indication information indicates an update rule of a timing offset parameter, and the first reference value is an initial value of the timing offset parameter. The processing module is configured to update a value of the timing offset parameter based on the first information and a timing offset variation, to obtain an updated value of the timing offset parameter, where an absolute value of the timing offset variation is equal to an absolute value of a difference between any two consecutively updated values of the timing offset parameter.

For a specific implementation of the terminal device, refer to a behavior function of the terminal device in the timing offset parameter update method provided in any one of the first aspect or the possible designs of the first aspect. Based on the terminal device in the second aspect, the terminal device may automatically update the value of the timing offset parameter according to the update rule of the timing offset parameter indicated by the first indication information and based on the first reference value and the timing offset variable, and a network device does not need to continuously update the value of the timing offset parameter and deliver the value to the terminal device by using signaling. Therefore, signaling overheads of the network device are reduced.

In a possible design, the first indication information includes the update rule, and the update rule includes at least one of the following: increasing the value of the timing offset parameter, or decreasing the value of the timing offset parameter; the first indication information includes a second reference value, and when the second reference value is greater than the first reference value, the first indication information indicates to increase the value of the timing offset parameter; or when the second reference value is less than the first reference value, the first indication information indicates to decrease the value of the timing offset parameter; or the first indication information includes a difference between a second reference value and the first reference value, and when the second reference value is greater than the first reference value, the first indication information indicates to increase the value of the timing offset parameter; or when the second reference value is less than the first reference value, the first indication information indicates to decrease the value of the timing offset parameter.

Based on this possible design, the first indication information may indicate the update rule of the timing offset parameter in an explicit indication manner. For example, the terminal device is directly indicated to increase the value of the timing offset parameter or decrease the value of the timing offset parameter. Alternatively, the first indication information may indicate the update rule of the timing offset parameter in an implicit indication manner. For example, the second reference value or the difference between the second reference value and the first reference value is indicated to the terminal device, to implicitly indicate the terminal device to update the value of the timing offset parameter toward a direction of the second reference value. This provides a feasible solution for the first indication information to indicate the update rule of the timing offset parameter.

In a possible design, the transceiver module is further configured to obtain second information, where the second information includes one or more of the following: a first moment, an update interval, an update moment, or a quantity of update times, the first moment indicates a moment at which the terminal device starts to update the value of the timing offset parameter, the update interval indicates a time interval between any two consecutive times of updating the value of the timing offset parameter by the terminal device, the update moment indicates a start moment at which the terminal device updates the value of the timing offset parameter, and the quantity of update times indicates a quantity of times that the terminal device updates the value of the timing offset parameter.

Based on this possible design, the network device sends the first moment to the terminal device, so that the terminal device and the network device can start to update the value of the timing offset parameter at a same moment. The network device sends the update interval to the terminal device, so that the terminal device and the network device can update the value of the timing offset parameter at a same time interval. The network device sends the update moment to the terminal device, so that the terminal device and the network device can update the value of the timing offset parameter at a same moment. The network device sends the quantity of update times to the terminal device, so that the terminal device and the network device can update the value of the timing offset parameter by using a same quantity of update times. The terminal device updates the value of the timing offset parameter based on the second information, so that it can be ensured that the value that is of the timing offset parameter corresponding to the terminal device and that is updated on a terminal device side is consistent with the value that is of the timing offset parameter corresponding to the terminal device and that is updated on a network device side.

In a possible design, the transceiver module is further configured to obtain second indication information indicating the terminal device to stop updating the value of the timing offset parameter, and the processing module is further configured to stop updating the value of the timing offset parameter based on the second indication information.

In a possible design, when the first indication information includes the second reference value or the difference between the second reference value and the first reference value, the processing module is further configured to: determine whether an absolute value of a difference between the updated value of the timing offset parameter and the second reference value is less than or equal to a first threshold; and if the absolute value of the difference between the updated value of the timing offset parameter and the second reference value is less than or equal to the first threshold, stop updating the value of the timing offset parameter.

Based on the foregoing two possible designs, the terminal device may stop updating the value of the timing offset parameter based on the explicit second indication information sent by the network device. Alternatively, the terminal device may implicitly determine, based on the first indication information that is sent by the network device and that includes the second reference value or the difference between the second reference value and the first reference value, that when the absolute value of the difference between the updated value of the timing offset parameter and the second reference value is less than or equal to the first threshold, the terminal device stops updating the value of the timing offset parameter.

In a possible design, the processing module is further configured to: after the absolute value of the difference between the updated value of the timing offset parameter and the second reference value is less than or equal to the first threshold, update the updated value of the timing offset parameter based on the timing offset variation until an absolute value of a difference between an updated value of the timing offset parameter and the first reference value is less than or equal to a second threshold.

Based on this possible design, the terminal device may update, based on the timing offset variation, the value of the timing offset parameter from the first reference value to the second reference value, and then update the value of the timing offset parameter from the second reference value to the first reference value. This is not limited.

In a possible design, the transceiver module is further configured to obtain third indication information indicating the terminal device to update the value of the timing offset parameter, and the processing module is further configured to update the value of the timing offset parameter based on the third indication information.

In a possible design, the transceiver module is configured to send, to the network device, fourth indication information indicating to update the value of the timing offset parameter, so that the network device updates, based on the fourth indication information, the value of the timing offset parameter corresponding to the terminal device.

Based on the foregoing two possible designs, the terminal device may update the value of the timing offset parameter based on the third indication information sent by the network device, or may send the fourth indication information to the network device, to indicate the network device to update the value of the timing offset parameter corresponding to the terminal device. This is not limited.

In a possible design, when the terminal device is located in a first area, the transceiver module is further configured to obtain first information corresponding to the first area; and when the terminal device hands over from the first area to a second area, the transceiver module is further configured to obtain first information corresponding to the second area, where the first area is a coverage area of a first beam, a first cell, or a first terminal device group, and the second area is a coverage area of a second beam, a second cell, or a second terminal device group.

Based on this possible design, when the terminal device is located in the first area, the terminal device may update the value of the timing offset parameter based on the first information corresponding to the first area. When the terminal device moves from the first area to the second area, the terminal device may update the value of the timing offset parameter based on the first information corresponding to the second area. The network device broadcasts different first information to different areas, so that terminal devices in a same area can automatically update the value of the timing offset parameter based on same first information, and signaling overheads for sending the first information by the network device can also be reduced.

According to a third aspect, an embodiment of this application provides a terminal device. The terminal device may be a terminal device, or a chip or a system on chip in the terminal device. The terminal device may implement a function performed by the terminal device in the foregoing aspects or possible designs, and the function may be implemented by hardware. In a possible design, the terminal device may include a transceiver and a processor. The transceiver and the processor may be configured to support the terminal device in implementing the function in any one of the first aspect or the possible designs of the first aspect. For example, the transceiver may be configured to obtain first information that includes a first reference value and first indication information, where the first indication information indicates an update rule of a timing offset parameter, and the first reference value is an initial value of the timing offset parameter. The processor may be configured to update a value of the timing offset parameter based on the first information and a timing offset variation, to obtain an updated value of the timing offset parameter, where an absolute value of the timing offset variation is equal to an absolute value of a difference between any two consecutively updated values of the timing offset parameter. In another possible design, the terminal device may further include a memory. The memory is configured to store computer-executable instructions and data that are necessary for the terminal device. When the terminal device runs, the transceiver and the processor execute the computer-executable instructions stored in the memory, so that the terminal device performs the timing offset parameter update method in any one of the first aspect or the possible designs of the first aspect.

For a specific implementation of the terminal device, refer to a behavior function of the terminal device in the timing offset parameter update method provided in any one of the first aspect or the possible designs of the first aspect.

According to a fourth aspect, an embodiment of this application provides a timing offset parameter update method. The method includes: A network device sends first information that includes a first reference value and first indication information to a terminal device, so that the terminal device updates a value of a timing offset parameter based on the first information and a timing offset variation, to obtain an updated value of the timing offset parameter, where the first indication information indicates an update rule of the timing offset parameter, the first reference value is an initial value of the timing offset parameter, and an absolute value of the timing offset variation is equal to an absolute value of a difference between any two consecutively updated values of the timing offset parameter.

Based on the fourth aspect, the network device sends the first information to the terminal device, so that the terminal device may automatically update the value of the timing offset parameter according to the update rule of the timing offset parameter indicated by the first indication information and based on the first reference value and the timing offset variation, and the network device does not need to continuously update the value of the timing offset parameter and deliver the value to the terminal device by using signaling. Therefore, signaling overheads of the network device are reduced.

In a possible design, the first indication information includes the update rule, and the update rule includes at least one of the following: increasing the value of the timing offset parameter, or decreasing the value of the timing offset parameter; the first indication information includes a second reference value, and when the second reference value is greater than the first reference value, the first indication information indicates to increase the value of the timing offset parameter; or when the second reference value is less than the first reference value, the first indication information indicates to decrease the value of the timing offset parameter; or the first indication information includes a difference between a second reference value and the first reference value, and when the second reference value is greater than the first reference value, the first indication information indicates to increase the value of the timing offset parameter; or when the second reference value is less than the first reference value, the first indication information indicates to decrease the value of the timing offset parameter.

Based on this possible design, the first indication information may indicate the update rule of the timing offset parameter in an explicit indication manner. For example, the terminal device is directly indicated to increase the value of the timing offset parameter or decrease the value of the timing offset parameter. Alternatively, the first indication information may indicate the update rule of the timing offset parameter in an implicit indication manner. For example, the second reference value or the difference between the second reference value and the first reference value is indicated to the terminal device, to implicitly indicate the terminal device to update the value of the timing offset parameter toward a direction of the second reference value. This provides a feasible solution for the first indication information to indicate the update rule of the timing offset parameter.

In a possible design, the network device updates, based on the first information and the timing offset variation, the value of the timing offset parameter corresponding to the terminal device.

Based on this possible design, the network device and the terminal device may update the value of the timing offset parameter corresponding to the terminal device by using a same mechanism, to ensure that the value of the timing offset parameter corresponding to the terminal device determined on a network device side is consistent with the value of the timing offset parameter corresponding to the terminal device determined on a terminal device side.

In a possible design, the network device sends second information to the terminal device, where the second information includes one or more of the following: a first moment, an update interval, an update moment, or a quantity of update times, the first moment indicates a moment at which the terminal device starts to update the value of the timing offset parameter, the update interval indicates a time interval between any two consecutive times of updating the value of the timing offset parameter by the terminal device, the update moment indicates a start moment at which the terminal device updates the value of the timing offset parameter, and the quantity of update times indicates a quantity of times that the terminal device updates the value of the timing offset parameter.

In a possible design, the network device updates, based on the second information, the value of the timing offset parameter corresponding to the terminal device.

Based on the foregoing two possible designs, the network device sends the first moment to the terminal device, so that the terminal device and the network device can start to update the value of the timing offset parameter at a same moment. The network device sends the update interval to the terminal device, so that the terminal device and the network device can update the value of the timing offset parameter at a same time interval. The network device sends the update moment to the terminal device, so that the terminal device and the network device can update the value of the timing offset parameter at a same moment. The network device sends the quantity of update times to the terminal device, so that the terminal device and the network device can update the value of the timing offset parameter by using a same quantity of update times. The terminal device updates the value of the timing offset parameter based on the second information, so that it can be ensured that the value that is of the timing offset parameter corresponding to the terminal device and that is updated on a terminal device side is consistent with the value that is of the timing offset parameter corresponding to the terminal device and that is updated on a network device side.

In a possible design, the network device sends second indication information to the terminal device, where the second indication information indicates the terminal device to stop updating the value of the timing offset parameter.

Based on this possible design, the network device may send the explicit second indication information to the terminal device, to indicate the terminal device to stop updating the value of the timing offset parameter. This provides a feasible solution for the terminal device to determine to stop updating the value of the timing offset parameter.

In a possible design, when the first indication information includes the second reference value or the difference between the second reference value and the first reference value, the network device determines whether an absolute value of a difference between the updated value of the timing offset parameter and the second reference value is less than or equal to a first threshold; and if the absolute value of the difference between the updated value of the timing offset parameter and the second reference value is less than or equal to the first threshold, stops updating the value of the timing offset parameter corresponding to the terminal device.

Based on this possible design, the network device may implicitly determine, based on the second reference value or the difference between the second reference value and the first reference value, to stop updating the value of the timing offset parameter when the absolute value of the difference between the updated value of the timing offset parameter and the second reference value is less than or equal to the first threshold.

In a possible design, after the absolute value of the difference between the updated value of the timing offset parameter corresponding to the terminal device and the second reference value is less than or equal to the first threshold, the network device updates, based on the timing offset variation, the updated value of the timing offset parameter corresponding to the terminal device until an absolute value of a difference between an updated value of the timing offset parameter corresponding to the terminal device and the first reference value is less than or equal to a second threshold.

Based on this possible design, the network device may update, based on the timing offset variation, the value of the timing offset parameter corresponding to the terminal device from the first reference value to the second reference value, and then update the value of the timing offset parameter from the second reference value to the first reference value. This is not limited.

In a possible design, the network device sends, to the terminal device, third indication information indicating the terminal device to update the value of the timing offset parameter.

In a possible design, the network device receives, from the terminal device, fourth indication information indicating to update the value of the timing offset parameter; and the network device updates, based on the fourth indication information, the value of the timing offset parameter corresponding to the terminal device.

Based on the foregoing two possible designs, the network device may send the third indication information to the terminal device, to indicate the terminal device to update the value of the timing offset parameter; or may receive the fourth indication information sent by the terminal device, and update, based on the fourth indication information, the timing offset parameter corresponding to the terminal device. This is not limited.

In a possible design, when the terminal device is located in a first area, the network device sends first information corresponding to the first area to the terminal device, where the first area is a coverage area of a first beam, a first cell, or a first terminal device group; and when the terminal device hands over from the first area to a second area, the network device sends first information corresponding to the second area to the terminal device, where the second area is a coverage area of a second beam, a second cell, or a second terminal device group.

Based on this possible design, when the terminal device is located in the first area, the terminal device may update the value of the timing offset parameter based on the first information that is corresponding to the first area and that is sent by the network device. When the terminal device moves from the first area to the second area, the terminal device may update the value of the timing offset parameter based on the first information that is corresponding to the second area and that is sent by the network device. The network device broadcasts different first information to different areas, so that terminal devices in a same area can automatically update the value of the timing offset parameter based on same first information, and signaling overheads for sending the first information by the network device can also be reduced.

According to a fifth aspect, an embodiment of this application provides a network device. The network device may implement a function performed by the network device in the fourth aspect or the possible designs of the fourth aspect, and the function may be implemented by hardware executing corresponding software. The hardware or the software includes one or more modules corresponding to the foregoing function, for example, a processing module and a transceiver module. The processing module is configured to determine first information; and the transceiver module is configured to send the first information that includes a first reference value and first indication information to a terminal device, so that the terminal device updates a value of a timing offset parameter based on the first information and a timing offset variation, to obtain an updated value of the timing offset parameter, where the first indication information indicates an update rule of the timing offset parameter, the first reference value is an initial value of the timing offset parameter, and an absolute value of the timing offset variation is equal to an absolute value of a difference between any two consecutively updated values of the timing offset parameter.

For a specific implementation of the network device, refer to a behavior function of the network device in the timing offset parameter update method provided in any one of the fourth aspect or the possible designs of the fourth aspect. Based on the network device in the fifth aspect, the network device sends the first information to the terminal device, so that the terminal device may automatically update the value of the timing offset parameter according to the update rule of the timing offset parameter indicated by the first indication information and based on the first reference value and the timing offset variable, and the network device does not need to continuously update the value of the timing offset parameter and deliver the value to the terminal device by using signaling. Therefore, signaling overheads of the network device are reduced.

In a possible design, the first indication information includes the update rule, and the update rule includes at least one of the following: increasing the value of the timing offset parameter, or decreasing the value of the timing offset parameter; the first indication information includes a second reference value, and when the second reference value is greater than the first reference value, the first indication information indicates to increase the value of the timing offset parameter; or when the second reference value is less than the first reference value, the first indication information indicates to decrease the value of the timing offset parameter; or the first indication information includes a difference between a second reference value and the first reference value, and when the second reference value is greater than the first reference value, the first indication information indicates to increase the value of the timing offset parameter; or when the second reference value is less than the first reference value, the first indication information indicates to decrease the value of the timing offset parameter.

Based on this possible design, the first indication information may indicate the update rule of the timing offset parameter in an explicit indication manner. For example, the terminal device is directly indicated to increase the value of the timing offset parameter or decrease the value of the timing offset parameter. Alternatively, the first indication information may indicate the update rule of the timing offset parameter in an implicit indication manner. For example, the second reference value or the difference between the second reference value and the first reference value is indicated to the terminal device, to implicitly indicate the terminal device to update the value of the timing offset parameter toward a direction of the second reference value. This provides a feasible solution for the first indication information to indicate the update rule of the timing offset parameter.

In a possible design, the processing module is configured to update, based on the first information and the timing offset variation, the value of the timing offset parameter corresponding to the terminal device.

Based on this possible design, the network device and the terminal device may update the value of the timing offset parameter corresponding to the terminal device by using a same mechanism, to ensure that the value of the timing offset parameter corresponding to the terminal device determined on a network device side is consistent with the value of the timing offset parameter corresponding to the terminal device determined on a terminal device side.

In a possible design, the transceiver module is further configured to send second information to the terminal device, where the second information includes one or more of the following: a first moment, an update interval, an update moment, or a quantity of update times, the first moment indicates a moment at which the terminal device starts to update the value of the timing offset parameter, the update interval indicates a time interval between any two consecutive times of updating the value of the timing offset parameter by the terminal device, the update moment indicates a start moment at which the terminal device updates the value of the timing offset parameter, and the quantity of update times indicates a quantity of times that the terminal device updates the value of the timing offset parameter.

In a possible design, the processing module is further configured to update, based on the second information, the value of the timing offset parameter corresponding to the terminal device.

Based on the foregoing two possible designs, the network device sends the first moment to the terminal device, so that the terminal device and the network device can start to update the value of the timing offset parameter at a same moment. The network device sends the update interval to the terminal device, so that the terminal device and the network device can update the value of the timing offset parameter at a same time interval. The network device sends the update moment to the terminal device, so that the terminal device and the network device can update the value of the timing offset parameter at a same moment. The network device sends the quantity of update times to the terminal device, so that the terminal device and the network device can update the value of the timing offset parameter by using a same quantity of update times. The terminal device updates the value of the timing offset parameter based on the second information, so that it can be ensured that the value that is of the timing offset parameter corresponding to the terminal device and that is updated on a terminal device side is consistent with the value that is of the timing offset parameter corresponding to the terminal device and that is updated on a network device side.

In a possible design, the transceiver module is further configured to send second indication information to the terminal device, where the second indication information indicates the terminal device to stop updating the value of the timing offset parameter.

Based on this possible design, the network device may send the explicit second indication information to the terminal device, to indicate the terminal device to stop updating the value of the timing offset parameter. This provides a feasible solution for the terminal device to determine to stop updating the value of the timing offset parameter.

In a possible design, when the first indication information includes the second reference value or the difference between the second reference value and the first reference value, the processing module is further configured to: determine whether an absolute value of a difference between the updated value of the timing offset parameter and the second reference value is less than or equal to a first threshold; and if the absolute value of the difference between the updated value of the timing offset parameter and the second reference value is less than or equal to the first threshold, stop updating the value of the timing offset parameter corresponding to the terminal device.

Based on this possible design, the network device may implicitly determine, based on the second reference value or the difference between the second reference value and the first reference value, to stop updating the value of the timing offset parameter when the absolute value of the difference between the updated value of the timing offset parameter and the second reference value is less than or equal to the first threshold.

In a possible design, the processing module is further configured to: after the absolute value of the difference between the updated value of the timing offset parameter corresponding to the terminal device and the second reference value is less than or equal to the first threshold, update, based on the timing offset variation, the updated value of the timing offset parameter corresponding to the terminal device until an absolute value of a difference between an updated value of the timing offset parameter corresponding to the terminal device and the first reference value is less than or equal to a second threshold.

Based on this possible design, the network device may update, based on the timing offset variation, the value of the timing offset parameter corresponding to the terminal device from the first reference value to the second reference value, and then update the value of the timing offset parameter from the second reference value to the first reference value. This is not limited.

In a possible design, the transceiver module is further configured to send, to the terminal device, third indication information indicating the terminal device to update the value of the timing offset parameter.

In a possible design, the transceiver module is configured to: receive, from the terminal device, fourth indication information indicating to update the value of the timing offset parameter; and the network device updates, based on the fourth indication information, the value of the timing offset parameter corresponding to the terminal device.

Based on the foregoing two possible designs, the network device may send the third indication information to the terminal device, to indicate the terminal device to update the value of the timing offset parameter; or may receive the fourth indication information sent by the terminal device, and update, based on the fourth indication information, the timing offset parameter corresponding to the terminal device. This is not limited.

In a possible design, when the terminal device is located in a first area, the transceiver module is further configured to send first information corresponding to the first area to the terminal device, where the first area is a coverage area of a first beam, a first cell, or a first terminal device group; and when the terminal device hands over from the first area to a second area, the transceiver module is further configured to send first information corresponding to the second area to the terminal device, where the second area is a coverage area of a second beam, a second cell, or a second terminal device group.

Based on this possible design, when the terminal device is located in the first area, the terminal device may update the value of the timing offset parameter based on the first information that is corresponding to the first area and that is sent by the network device. When the terminal device moves from the first area to the second area, the terminal device may update the value of the timing offset parameter based on the first information that is corresponding to the second area and that is sent by the network device. The network device broadcasts different first information to different areas, so that terminal devices in a same area can automatically update the value of the timing offset parameter based on same first information, and signaling overheads for sending the first information by the network device can also be reduced.

According to a sixth aspect, an embodiment of this application provides a network device. The network device may be a network device, or a chip or a system on chip in the network device. The network device may implement a function performed by the network device in the foregoing aspects or possible designs, and the function may be implemented by hardware. In a possible design, the network device may include a processor and a transceiver. The processor and the transceiver may be configured to support the network device in implementing the function in any one of the fourth aspect or the possible designs of the fourth aspect. For example, the processor may be configured to determine first information; and the transceiver may be configured to send the first information that includes a first reference value and first indication information to a terminal device, so that the terminal device updates a value of a timing offset parameter based on the first information and a timing offset variation, to obtain an updated value of the timing offset parameter, where the first indication information indicates an update rule of the timing offset parameter, the first reference value is an initial value of the timing offset parameter, and an absolute value of the timing offset variation is equal to an absolute value of a difference between any two consecutively updated values of the timing offset parameter. In another possible design, the network device may further include a processor and a memory. The memory is configured to store computer-executable instructions and data that are necessary for the network device. When the network device runs, the transceiver and the processor execute the computer-executable instructions stored in the memory, so that the network device performs the timing offset parameter update method in any one of the fourth aspect or the possible designs of the fourth aspect.

For a specific implementation of the network device, refer to a behavior function of the network device in the timing offset parameter update method provided in any one of the fourth aspect or the possible designs of the fourth aspect.

According to a seventh aspect, an embodiment of this application provides a timing offset parameter update method. The method includes: A terminal device obtains first location information and second location information, where the first location information indicates a location of a reference point, and the second location information indicates a location of a network device. The terminal device determines a third reference value based on the first location information and the second location information. The terminal device determines whether an absolute value of a difference between the third reference value and a value of a timing offset parameter currently used by the terminal device is greater than or equal to a timing offset variation. If the absolute value of the difference between the third reference value and the value of the timing offset parameter currently used by the terminal device is greater than or equal to the timing offset variation, the terminal device updates the value of the timing offset parameter to the third reference value.

Based on the seventh aspect, the terminal device may determine the third reference value based on the location of the reference point and the location of the network device, compare the third reference value with the value of the timing offset parameter currently used by the terminal device, and automatically update the value of the timing offset parameter based on a comparison result. The network device does not need to continuously update the value of the timing offset parameter and deliver the value to the terminal device by using signaling. Therefore, signaling overheads of the network device are reduced.

In a possible design, the terminal device determines, based on the first location information and the second location information, a round trip delay corresponding to the reference point, where the round trip delay is a quotient of twice a distance between the reference point and the network device and a transmission speed; and the terminal device determines the third reference value based on the round trip delay.

Based on this possible design, the terminal device may determine, based on the location of the reference point and the location of the network device, the round trip delay corresponding to the reference point, and determine the third reference value based on the round trip delay. This provides a feasible solution for the terminal device to determine the third reference value.

According to an eighth aspect, an embodiment of this application provides a terminal device. The terminal device may implement a function performed by the terminal device in the seventh aspect or the possible designs of the seventh aspect, and the function may be implemented by hardware executing corresponding software. The hardware or the software includes one or more modules corresponding to the foregoing function, for example, a transceiver module and a processing module. The transceiver module is configured to obtain first location information and second location information, where the first location information indicates a location of a reference point, and the second location information indicates a location of a network device. The processing module is configured to determine a third reference value based on the first location information and the second location information. The processing module is further configured to determine whether an absolute value of a difference between the third reference value and a value of a timing offset parameter currently used by the terminal device is greater than or equal to a timing offset variation. If the absolute value of the difference between the third reference value and the value of the timing offset parameter currently used by the terminal device is greater than or equal to the timing offset variation, the terminal device updates the value of the timing offset parameter to the third reference value.

For a specific implementation of the terminal device, refer to a behavior function of the terminal device in the timing offset parameter update method provided in any one of the seventh aspect or the possible designs of the seventh aspect. Based on the terminal device in the eighth aspect, the terminal device may determine the third reference value based on the location of the reference point and the location of the network device, compare the third reference value with the value of the timing offset parameter currently used by the terminal device, and automatically update the value of the timing offset parameter based on a comparison result. The network device does not need to continuously update the value of the timing offset parameter and deliver the value to the terminal device by using signaling. Therefore, signaling overheads of the network device are reduced.

In a possible design, the processing module is further configured to determine, based on the first location information and the second location information, a round trip delay corresponding to the reference point, where the round trip delay is a quotient of twice a distance between the reference point and the network device and a transmission speed; and the terminal device determines the third reference value based on the round trip delay.

Based on this possible design, the terminal device may determine, based on the location of the reference point and the location of the network device, the round trip delay corresponding to the reference point, and determine the third reference value based on the round trip delay. This provides a feasible solution for the terminal device to determine the third reference value.

According to a ninth aspect, an embodiment of this application provides a terminal device. The terminal device may be a terminal device, or a chip or a system on chip in the terminal device. The terminal device may implement a function performed by the terminal device in the foregoing aspects or possible designs, and the function may be implemented by hardware. In a possible design, the terminal device may include a transceiver and a processor. The transceiver and the processor may be configured to support the terminal device in implementing the function in any one of the seventh aspect or the possible designs of the seventh aspect. For example, the transceiver may be configured to obtain first location information and second location information, where the first location information indicates a location of a reference point, and the second location information indicates a location of a network device. The processor may be configured to determine a third reference value based on the first location information and the second location information. The processor may be further configured to determine whether an absolute value of a difference between the third reference value and a value of a timing offset parameter currently used by the terminal device is greater than or equal to a timing offset variation. If the absolute value of the difference between the third reference value and the value of the timing offset parameter currently used by the terminal device is greater than or equal to the timing offset variation, the terminal device updates the value of the timing offset parameter to the third reference value. In another possible design, the terminal device may further include a memory. The memory is configured to store computer-executable instructions and data that are necessary for the terminal device. When the terminal device runs, the transceiver and the processor execute the computer-executable instructions stored in the memory, so that the terminal device performs the timing offset parameter update method in any one of the seventh aspect or the possible designs of the seventh aspect.

For a specific implementation of the terminal device, refer to a behavior function of the terminal device in the timing offset parameter update method provided in any one of the seventh aspect or the possible designs of the seventh aspect.

According to a tenth aspect, an embodiment of this application provides a timing offset parameter update method. The method includes: A network device sends first location information and second location information to a terminal device, so that the terminal device determines a third reference value based on the first location information and the second location information, and determines whether an absolute value of a difference between the third reference value and a value of a timing offset parameter currently used by the terminal device is greater than or equal to a timing offset variation; and if the absolute value of the difference between the third reference value and the value of the timing offset parameter currently used by the terminal device is greater than or equal to the timing offset variation, the terminal device updates the value of the timing offset parameter to the third reference value, where the first location information indicates a location of a reference point, and the second location information indicates a location of the network device.

Based on the tenth aspect, the network device sends the location of the reference point and the location of the network device to the terminal device, so that the terminal device may determine the third reference value based on the location of the reference point and the location of the network device, compare the third reference value with the value of the timing offset parameter currently used by the terminal device, and automatically update the value of the timing offset parameter based on a comparison result. The network device does not need to continuously update the value of the timing offset parameter and deliver the value to the terminal device by using signaling. Therefore, signaling overheads of the network device are reduced.

In a possible design, the network device determines the third reference value based on the first location information and the second location information, and determines whether the absolute value of the difference between the third reference value and the value of the timing offset parameter currently used by the terminal device is greater than or equal to the timing offset variation; and if the absolute value of the difference between the third reference value and the value of the timing offset parameter currently used by the terminal device is greater than or equal to the timing offset variation, the network device updates the value of the timing offset parameter corresponding to the terminal device to the third reference value.

Based on this possible design, the network device and the terminal device may update the value of the timing offset parameter corresponding to the terminal device by using a same mechanism, to ensure that the value of the timing offset parameter corresponding to the terminal device determined on a network device side is consistent with the value of the timing offset parameter corresponding to the terminal device determined on a terminal device side.

In a possible design, the network device determines, based on the first location information and the second location information, a round trip delay corresponding to the reference point, where the round trip delay is a quotient of twice a distance between the reference point and the network device and a transmission speed; and the network device determines the third reference value based on the round trip delay.

Based on this possible design, the network device may determine, based on the location of the reference point and the location of the network device, the round trip delay corresponding to the reference point, and determine the third reference value based on the round trip delay. This provides a feasible solution for the network device to determine the third reference value.

According to an eleventh aspect, an embodiment of this application provides a network device. The network device may implement a function performed by the network device in the tenth aspect or the possible designs of the tenth aspect, and the function may be implemented by hardware executing corresponding software. The hardware or the software includes one or more modules corresponding to the foregoing function, for example, a processing module and a transceiver module. The processing module is configured to determine first location information and second location information. The transceiver module is configured to send the first location information and the second location information to a terminal device, so that the terminal device determines a third reference value based on the first location information and the second location information, and determines whether an absolute value of a difference between the third reference value and a value of a timing offset parameter currently used by the terminal device is greater than or equal to a timing offset variation; and if the absolute value of the difference between the third reference value and the value of the timing offset parameter currently used by the terminal device is greater than or equal to the timing offset variation, the terminal device updates the value of the timing offset parameter to the third reference value, where the first location information indicates a location of a reference point, and the second location information indicates a location of the network device.

For a specific implementation of the network device, refer to a behavior function of the network device in the timing offset parameter update method provided in any one of the tenth aspect or the possible designs of the tenth aspect. Based on the network device in the eleventh aspect, the network device sends the location of the reference point and the location of the network device to the terminal device, so that the terminal device may determine the third reference value based on the location of the reference point and the location of the network device, compare the third reference value with the value of the timing offset parameter currently used by the terminal device, and automatically update the value of the timing offset parameter based on a comparison result. The network device does not need to continuously update the value of the timing offset parameter and deliver the value to the terminal device by using signaling. Therefore, signaling overheads of the network device are reduced.

In a possible design, the processing module is configured to determine the third reference value based on the first location information and the second location information. The processing module is further configured to: determine whether the absolute value of the difference between the third reference value and the value of the timing offset parameter currently used by the terminal device is greater than or equal to the timing offset variation; and if the absolute value of the difference between the third reference value and the value of the timing offset parameter currently used by the terminal device is greater than or equal to the timing offset variation, update the value of the timing offset parameter corresponding to the terminal device to the third reference value.

Based on this possible design, the network device and the terminal device may update the value of the timing offset parameter corresponding to the terminal device by using a same mechanism, to ensure that the value of the timing offset parameter corresponding to the terminal device determined on a network device side is consistent with the value of the timing offset parameter corresponding to the terminal device determined on a terminal device side.

In a possible design, the processing module is further configured to determine, based on the first location information and the second location information, a round trip delay corresponding to the reference point, where the round trip delay is a quotient of twice a distance between the reference point and the network device and a transmission speed; and the processing module is further configured to determine the third reference value based on the round trip delay.

Based on this possible design, the network device may determine, based on the location of the reference point and the location of the network device, the round trip delay corresponding to the reference point, and determine the third reference value based on the round trip delay. This provides a feasible solution for the network device to determine the third reference value.

According to a twelfth aspect, an embodiment of this application provides a network device. An embodiment of this application provides a network device. The network device may be a network device, or a chip or a system on chip in the network device. The network device may implement a function performed by the network device in the foregoing aspects or possible designs, and the function may be implemented by hardware. In a possible design, the network device may include a processor and a transceiver. The transceiver may be configured to support the network device in implementing the function in any one of the tenth aspect or the possible designs of the tenth aspect. For example, the processor may be configured to determine first location information and second location information. The transceiver may be configured to send the first location information and the second location information to a terminal device, so that the terminal device determines a third reference value based on the first location information and the second location information, and determines whether an absolute value of a difference between the third reference value and a value of a timing offset parameter currently used by the terminal device is greater than or equal to a timing offset variation; and if the absolute value of the difference between the third reference value and the value of the timing offset parameter currently used by the terminal device is greater than or equal to the timing offset variation, the terminal device updates the value of the timing offset parameter to the third reference value, where the first location information indicates a location of a reference point, and the second location information indicates a location of the network device. In another possible design, the network device may further include a processor and a memory. The memory is configured to store computer-executable instructions and data that are necessary for the network device. When the network device runs, the transceiver and the processor execute the computer-executable instructions stored in the memory, so that the network device performs the timing offset parameter update method in any one of the tenth aspect or the possible designs of the tenth aspect.

For a specific implementation of the network device, refer to a behavior function of the network device in the timing offset parameter update method provided in any one of the tenth aspect or the possible designs of the tenth aspect.

According to a thirteenth aspect, an embodiment of this application provides a timing offset parameter update method. The method includes: A terminal device obtains third information including a mapping relationship between a value of a timing offset parameter and an area, where the area is a coverage area of a beam, a cell, or a terminal device group. The terminal device determines the value of the timing offset parameter based on the mapping relationship and an area corresponding to the terminal device.

Based on the thirteenth aspect, the terminal device may automatically update the value of the timing offset parameter based on the third information and the area in which the terminal device is currently located, and a network device does not need to continuously update the value of the timing offset parameter and deliver the value to the terminal device by using signaling. Therefore, signaling overheads of the network device are reduced.

In a possible design, the mapping relationship between the value of the timing offset parameter and the area includes one or more of the following: a correspondence between a value of the timing offset parameter and a synchronization signal block SSB number, a mapping relationship between a value of the timing offset parameter and a bandwidth part BWP number, or a mapping relationship between a value of the timing offset parameter and a transmission configuration indicator TCI number.

Based on this possible design, the mapping relationship between the value of the timing offset parameter and the area may be one or more of the foregoing mapping relationships. This is not limited.

According to a fourteenth aspect, an embodiment of this application provides a terminal device. The terminal device may implement a function performed by the terminal device in the thirteenth aspect or the possible designs of the thirteenth aspect, and the function may be implemented by hardware executing corresponding software. The hardware or the software includes one or more modules corresponding to the foregoing function, for example, a transceiver module and a processing module. The transceiver module is configured to obtain third information including a mapping relationship between a value of a timing offset parameter and an area, where the area is a coverage area of a beam, a cell, or a terminal device group. The processing module is configured to determine the value of the timing offset parameter based on the mapping relationship and an area corresponding to the terminal device.

For a specific implementation of the terminal device, refer to a behavior function of the terminal device in the timing offset parameter update method provided in any one of the thirteenth aspect or the possible designs of the thirteenth aspect. Based on the terminal device in the fourteenth aspect, the terminal device may automatically update the value of the timing offset parameter based on the third information and the area in which the terminal device is currently located, and a network device does not need to continuously update the value of the timing offset parameter and deliver the value to the terminal device by using signaling. Therefore, signaling overheads of the network device are reduced.

In a possible design, the mapping relationship between the value of the timing offset parameter and the area includes one or more of the following: a correspondence between a value of the timing offset parameter and a synchronization signal block SSB number, a mapping relationship between a value of the timing offset parameter and a bandwidth part BWP number, or a mapping relationship between a value of the timing offset parameter and a transmission configuration indicator TCI number.

Based on this possible design, the mapping relationship between the value of the timing offset parameter and the area may be one or more of the foregoing mapping relationships. This is not limited.

According to a fifteenth aspect, an embodiment of this application provides a terminal device. The terminal device may be a terminal device, or a chip or a system on chip in the terminal device. The terminal device may implement a function performed by the terminal device in the foregoing aspects or possible designs, and the function may be implemented by hardware. In a possible design, the terminal device may include a transceiver and a processor. The transceiver and the processor may be configured to support the terminal device in implementing the function in any one of the thirteenth aspect or the possible designs of the thirteenth aspect. For example, the transceiver may be configured to obtain third information including a mapping relationship between a value of a timing offset parameter and an area, where the area is a coverage area of a beam, a cell, or a terminal device group. The processor may be configured to determine the value of the timing offset parameter based on the mapping relationship and an area corresponding to the terminal device. In another possible design, the terminal device may further include a memory. The memory is configured to store computer-executable instructions and data that are necessary for the terminal device. When the terminal device runs, the transceiver and the processor execute the computer-executable instructions stored in the memory, so that the terminal device performs the timing offset parameter update method in any one of the thirteenth aspect or the possible designs of the thirteenth aspect.

For a specific implementation of the terminal device, refer to a behavior function of the terminal device in the timing offset parameter update method provided in any one of the thirteenth aspect or the possible designs of the thirteenth aspect.

According to a sixteenth aspect, an embodiment of this application provides a timing offset parameter update method. The method includes: A network device sends, to a terminal device, third information including a mapping relationship between a value of a timing offset parameter and an area, so that the terminal device determines the value of the timing offset parameter based on the mapping relationship and an area corresponding to the terminal device, where the area is a coverage area of a beam, a cell, or a terminal device group.

Based on the sixteenth aspect, the network device sends the third information to the terminal device, so that the terminal device may automatically update the value of the timing offset parameter based on the third information and the area in which the terminal device is currently located, and the network device does not need to continuously update the value of the timing offset parameter and deliver the value to the terminal device by using signaling. Therefore, signaling overheads of the network device are reduced.

In a possible design, the network device determines, based on the third information and the area corresponding to the terminal device, the value of the timing offset parameter corresponding to the terminal device.

Based on this possible design, the network device and the terminal device may update the value of the timing offset parameter corresponding to the terminal device by using a same mechanism, to ensure that the value of the timing offset parameter corresponding to the terminal device determined on a network device side is consistent with the value of the timing offset parameter corresponding to the terminal device determined on a terminal device side.

In a possible design, the mapping relationship between the value of the timing offset parameter and the area includes one or more of the following: a correspondence between a value of the timing offset parameter and a synchronization signal block SSB number, a mapping relationship between a value of the timing offset parameter and a bandwidth part BWP number, or a mapping relationship between a value of the timing offset parameter and a transmission configuration indicator TCI number.

Based on this possible design, the mapping relationship between the value of the timing offset parameter and the area may be one or more of the foregoing mapping relationships. This is not limited.

According to a seventeenth aspect, an embodiment of this application provides a network device. The network device may implement a function performed by the network device in the sixteenth aspect or the possible designs of the sixteenth aspect, and the function may be implemented by hardware executing corresponding software. The hardware or the software includes one or more modules corresponding to the foregoing function, for example, a processing module and a transceiver module. The processing module is configured to determine third information. The transceiver module is configured to send, to a terminal device, the third information including a mapping relationship between a value of a timing offset parameter and an area, so that the terminal device determines the value of the timing offset parameter based on the mapping relationship and an area corresponding to the terminal device, where the area is a coverage area of a beam, a cell, or a terminal device group.

For a specific implementation of the network device, refer to a behavior function of the network device in the timing offset parameter update method provided in any one of the sixteenth aspect or the possible designs of the sixteenth aspect. Based on the network device in the seventeenth aspect, the network device sends the third information to the terminal device, so that the terminal device may automatically update the value of the timing offset parameter based on the third information and the area in which the terminal device is currently located, and the network device does not need to continuously update the value of the timing offset parameter and deliver the value to the terminal device by using signaling. Therefore, signaling overheads of the network device are reduced.

In a possible design, the processing module is configured to determine, based on the third information and the area corresponding to the terminal device, the value of the timing offset parameter corresponding to the terminal device.

Based on this possible design, the network device and the terminal device may update the value of the timing offset parameter corresponding to the terminal device by using a same mechanism, to ensure that the value of the timing offset parameter corresponding to the terminal device determined on a network device side is consistent with the value of the timing offset parameter corresponding to the terminal device determined on a terminal device side.

In a possible design, the mapping relationship between the value of the timing offset parameter and the area includes one or more of the following: a correspondence between a value of the timing offset parameter and a synchronization signal block SSB number, a mapping relationship between a value of the timing offset parameter and a bandwidth part BWP number, or a mapping relationship between a value of the timing offset parameter and a transmission configuration indicator TCI number.

Based on this possible design, the mapping relationship between the value of the timing offset parameter and the area may be one or more of the foregoing mapping relationships. This is not limited.

According to an eighteenth aspect, an embodiment of this application provides a network device. The network device may be a network device, or a chip or a system on chip in the network device. The network device may implement a function performed by the network device in the foregoing aspects or possible designs, and the function may be implemented by hardware. In a possible design, the network device may include a processor and a transceiver. The transceiver may be configured to support the network device in implementing the function in any one of the sixteenth aspect or the possible designs of the sixteenth aspect. For example, the processor may be configured to determine third information. The transceiver may be configured to send, to a terminal device, third information including a mapping relationship between a value of a timing offset parameter and an area, so that the terminal device determines the value of the timing offset parameter based on the mapping relationship and an area corresponding to the terminal device, where the area is a coverage area of a beam, a cell, or a terminal device group. In another possible design, the network device may further include a processor and a memory. The memory is configured to store computer-executable instructions and data that are necessary for the network device. When the network device runs, the transceiver and the processor execute the computer-executable instructions stored in the memory, so that the network device performs the timing offset parameter update method in any one of the sixteenth aspect or the possible designs of the sixteenth aspect.

For a specific implementation of the network device, refer to a behavior function of the network device in the timing offset parameter update method provided in any one of the sixteenth aspect or the possible designs of the sixteenth aspect.

According to a nineteenth aspect, a communication apparatus is provided. The communication apparatus includes one or more processors and one or more memories. The one or more memories are coupled to the one or more processors, and the one or more memories are configured to store computer program code or computer instructions. When the one or more processors execute the computer instructions, the communication apparatus is enabled to perform the timing offset parameter update method in any one of the first aspect or the possible designs of the first aspect, perform the timing offset parameter update method in any one of the fourth aspect or the possible designs of the fourth aspect, perform the timing offset parameter update method in any one of the seventh aspect or the possible designs of the seventh aspect, perform the timing offset parameter update method in any one of the tenth aspect or the possible designs of the tenth aspect, perform the timing offset parameter update method in any one of the thirteenth aspect or the possible designs of the thirteenth aspect, or perform the timing offset parameter update method in any one of the sixteenth aspect or the possible designs of the sixteenth aspect.

According to a twentieth aspect, a computer-readable storage medium is provided. The computer-readable storage medium stores computer instructions or a program. When the computer instructions or the program is run on a computer, the computer is enabled to perform the timing offset parameter update method in any one of the first aspect or the possible designs of the first aspect, perform the timing offset parameter update method in any one of the fourth aspect or the possible designs of the fourth aspect, perform the timing offset parameter update method in any one of the seventh aspect or the possible designs of the seventh aspect, perform the timing offset parameter update method in any one of the tenth aspect or the possible designs of the tenth aspect, perform the timing offset parameter update method in any one of the thirteenth aspect or the possible designs of the thirteenth aspect, or perform the timing offset parameter update method in any one of the sixteenth aspect or the possible designs of the sixteenth aspect.

According to a twenty-first aspect, a computer program product including instructions is provided. When the computer program product runs on a computer, the computer is enabled to perform the timing offset parameter update method in any one of the first aspect or the possible designs of the first aspect, perform the timing offset parameter update method in any one of the fourth aspect or the possible designs of the fourth aspect, perform the timing offset parameter update method in any one of the seventh aspect or the possible designs of the seventh aspect, perform the timing offset parameter update method in any one of the tenth aspect or the possible designs of the tenth aspect, perform the timing offset parameter update method in any one of the thirteenth aspect or the possible designs of the thirteenth aspect, or perform the timing offset parameter update method in any one of the sixteenth aspect or the possible designs of the sixteenth aspect.

According to a twenty-second aspect, a chip is provided. The chip includes a logic circuit and an input/output interface. The logic circuit is configured to read instructions, so that the chip performs the timing offset parameter update method in any one of the first aspect or the possible designs of the first aspect, performs the timing offset parameter update method in any one of the fourth aspect or the possible designs of the fourth aspect, perform the timing offset parameter update method in any one of the seventh aspect or the possible designs of the seventh aspect, performs the timing offset parameter update method in any one of the tenth aspect or the possible designs of the tenth aspect, performs the timing offset parameter update method in any one of the thirteenth aspect or the possible designs of the thirteenth aspect, or performs the timing offset parameter update method in any one of the sixteenth aspect or the possible designs of the sixteenth aspect.

For technical effects brought by any design manner of the nineteenth aspect to the twenty-second aspect, refer to technical effects brought by any possible design of the first aspect and the second aspect, refer to technical effects brought by any possible design of the fourth aspect and the fifth aspect, refer to technical effects brought by any possible design of the seventh aspect and the eighth aspect, refer to technical effects brought by any possible design of the tenth aspect and the eleventh aspect, refer to technical effects brought by any possible design of the thirteenth aspect and the fourteenth aspect, or refer to technical effects brought by any possible design of the sixteenth aspect and the seventeenth aspect. Details are not described again.

According to a twenty-third aspect, a communication system is provided. The communication system includes the terminal device in the second aspect or the third aspect and the network device in the fifth aspect or the sixth aspect, includes the terminal device in the eighth aspect or the ninth aspect and the network device in the eleventh aspect or the twelfth aspect, or includes the terminal device in the fourteenth aspect or the fifteenth aspect and the network device in the seventeenth aspect or the eighteenth aspect.

Figure 1A:
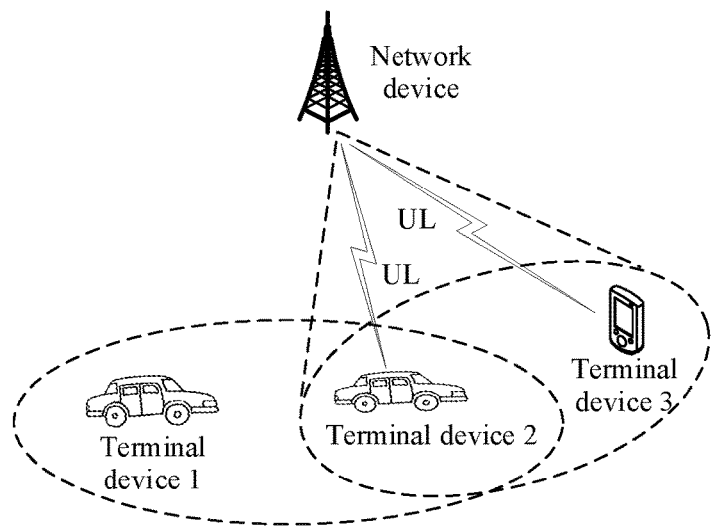
FIG. 1a is a schematic diagram of a communication system according to an embodiment of this application.
Figure 1B:
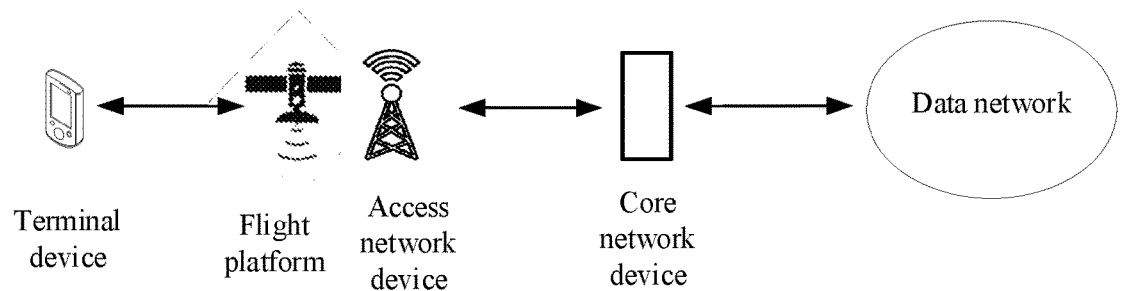
FIG. 1b is a schematic diagram of a communication architecture of a communication system according to an embodiment of this application.
Figure 1C:
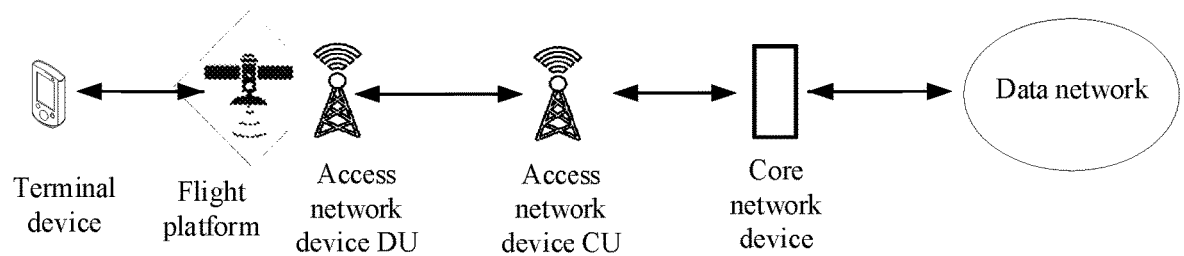
FIG. 1c is a schematic diagram of a communication architecture of a communication system according to an embodiment of this application.
Figure 1D:
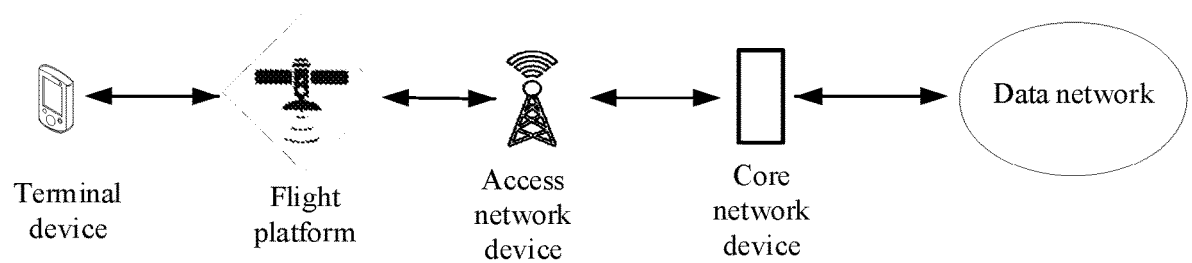
FIG. 1d is a schematic diagram of a communication architecture of a communication system according to an embodiment of this application.
Figure 1E:
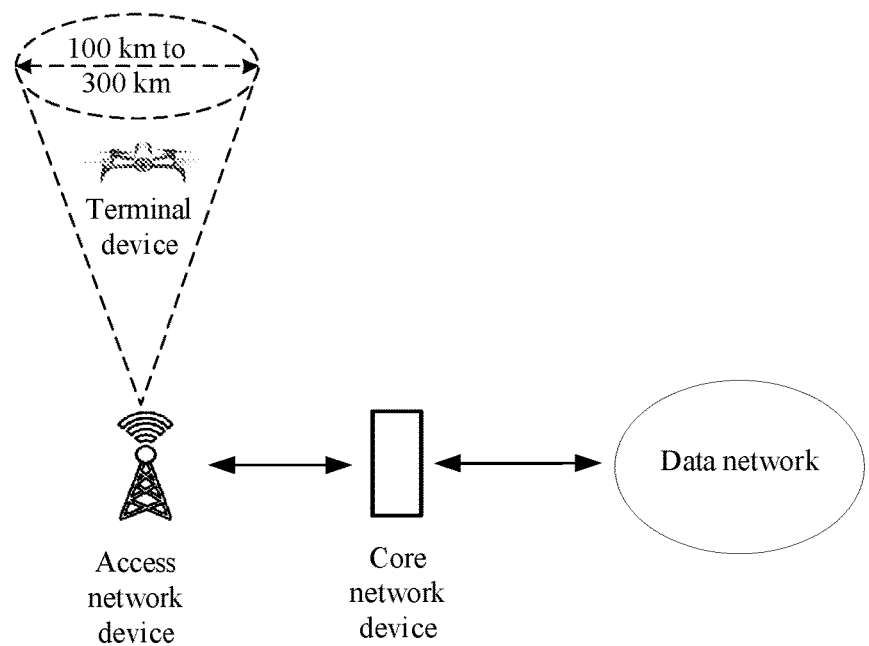
FIG. 1e is a schematic diagram of a communication architecture of a communication system according to an embodiment of this application.
Figure 1F:
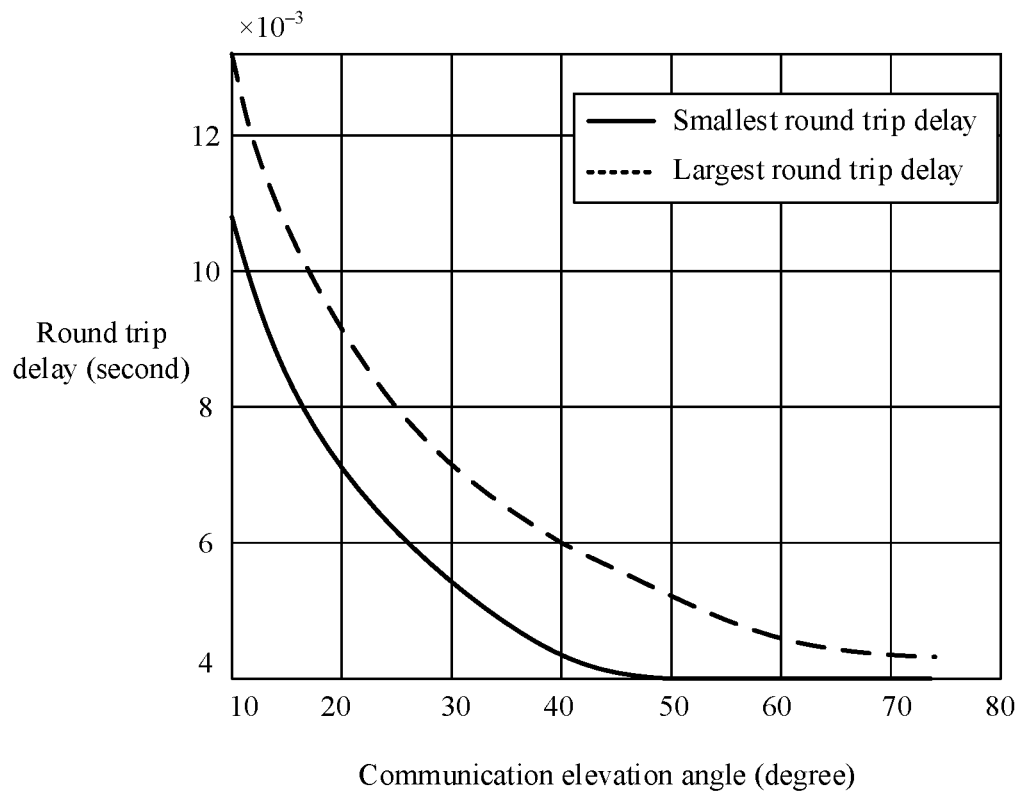
Figure 1G:
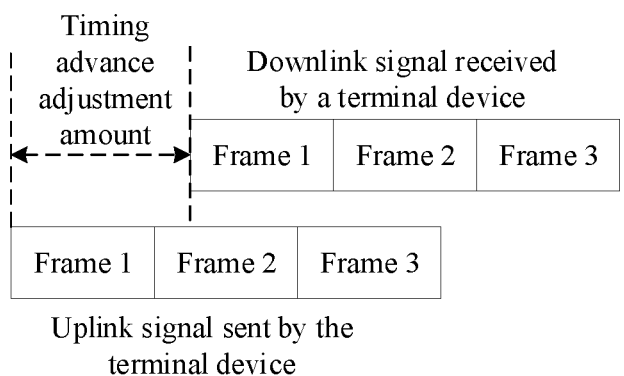
Figure 1H:
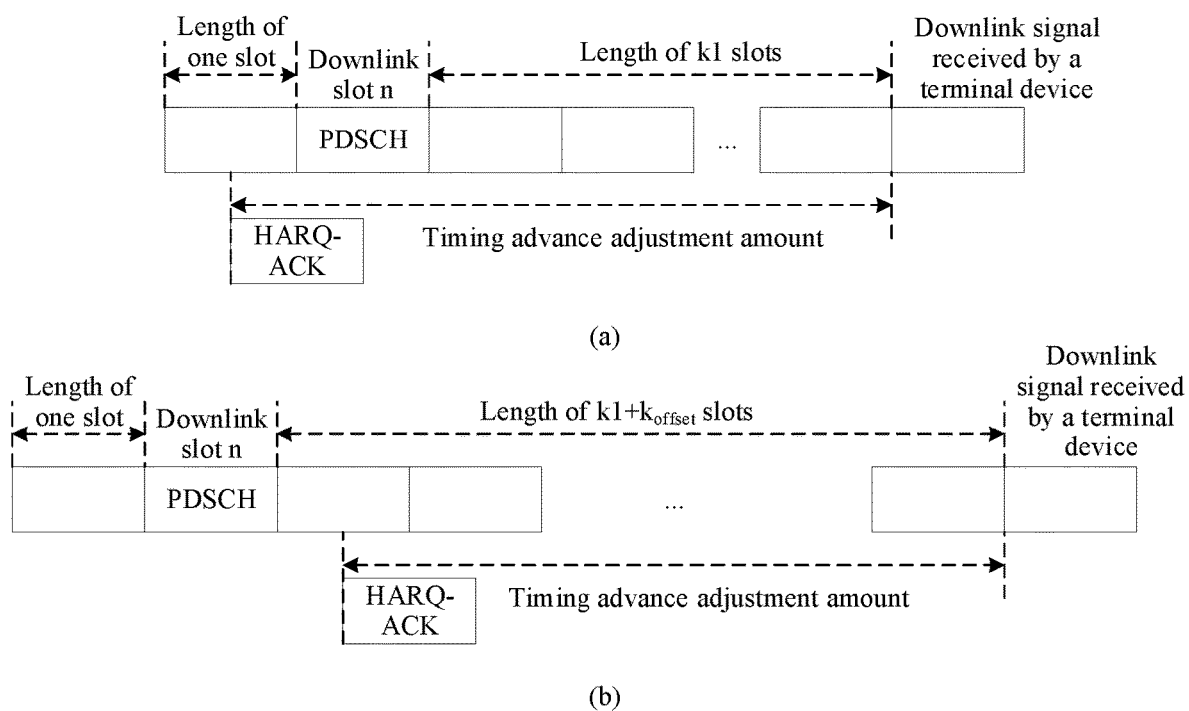
Figure 1I:
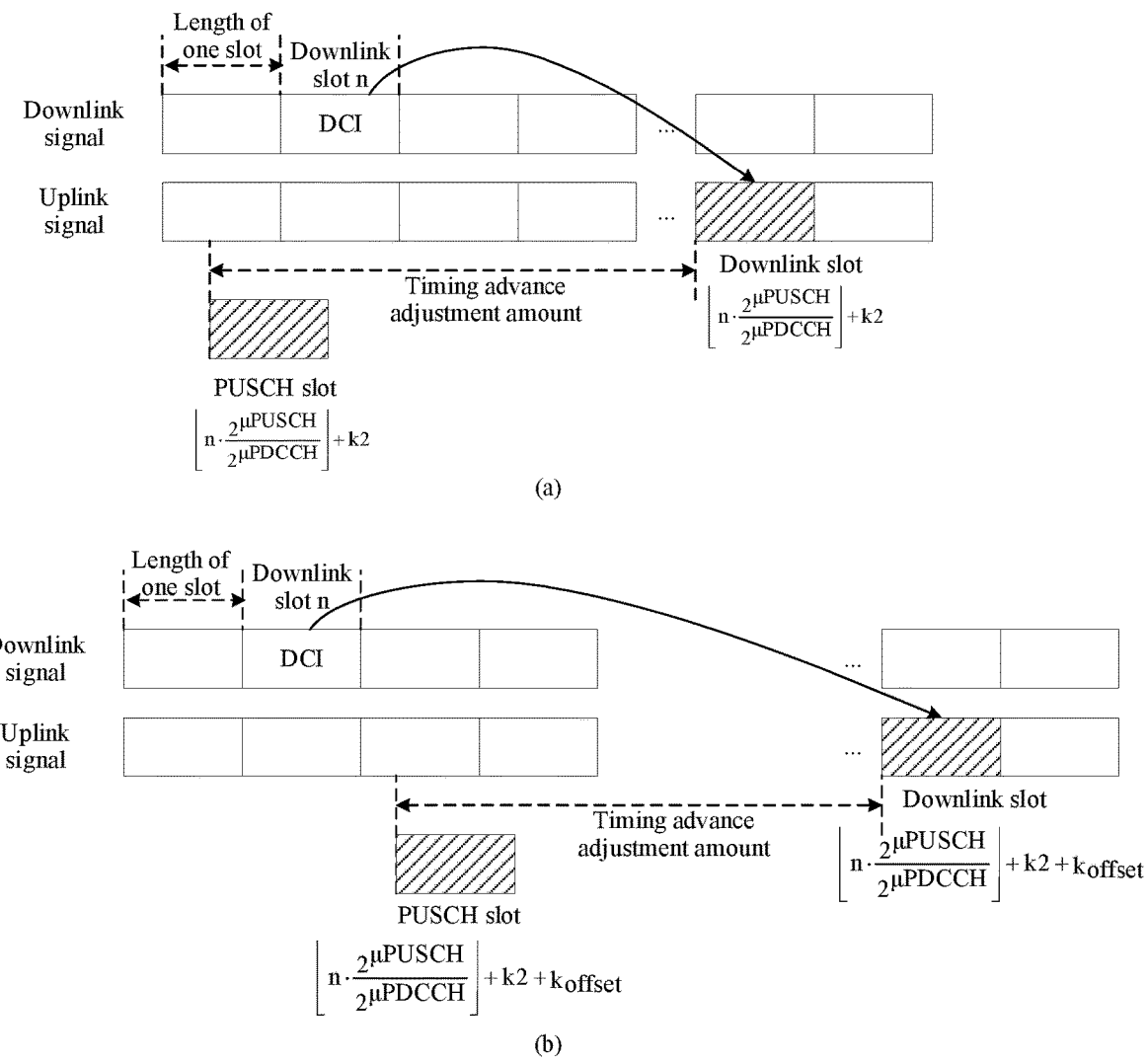
Figure 1J:
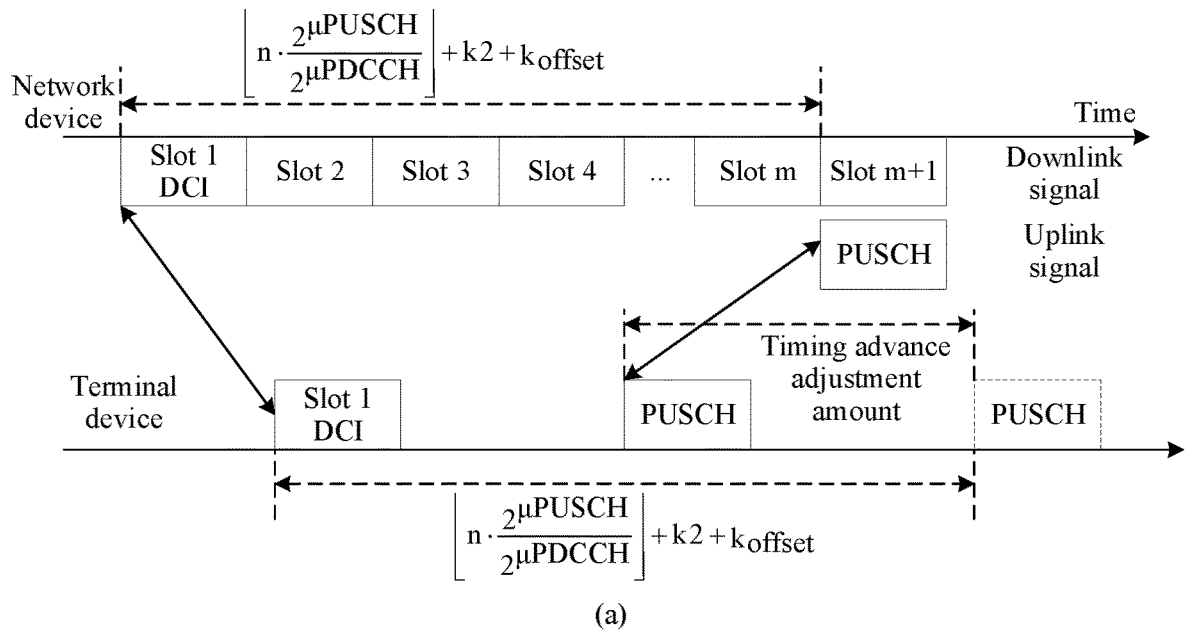
Figure 1J:
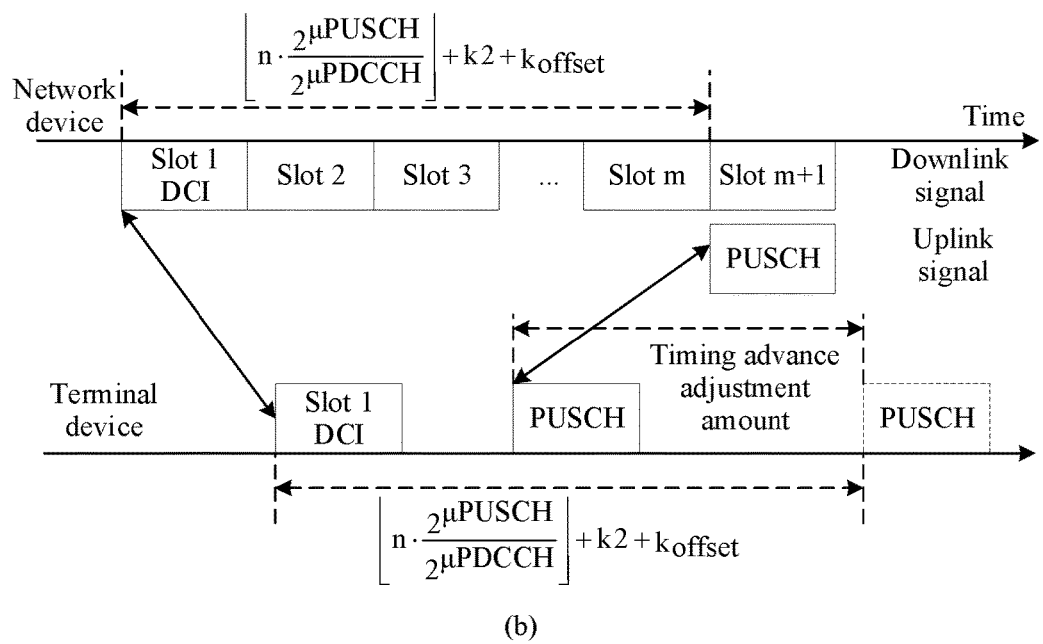
Figure 2:
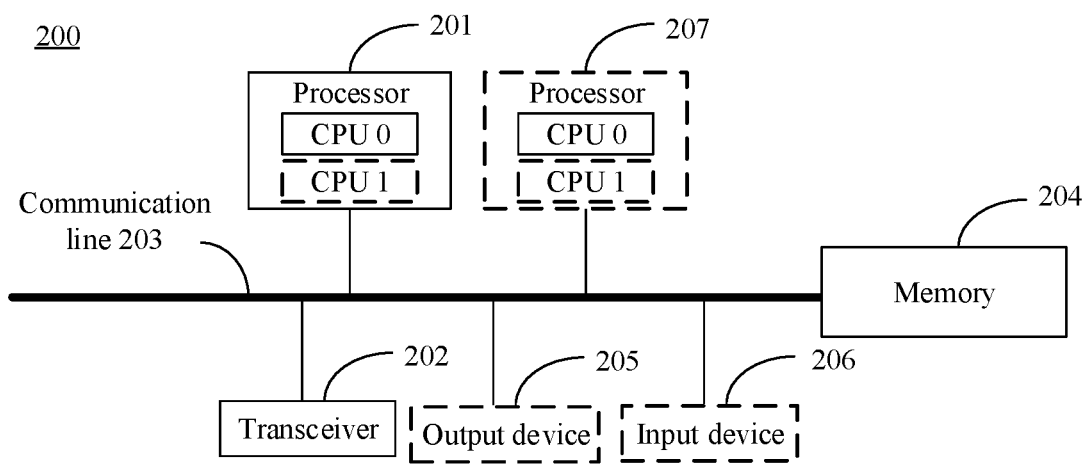
Figure 3:
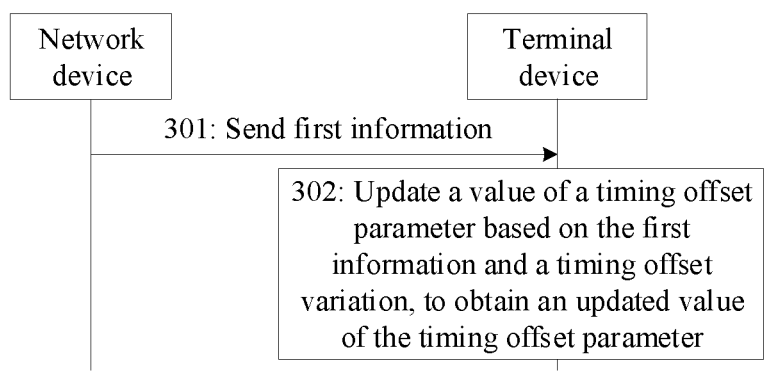
Figure 4:
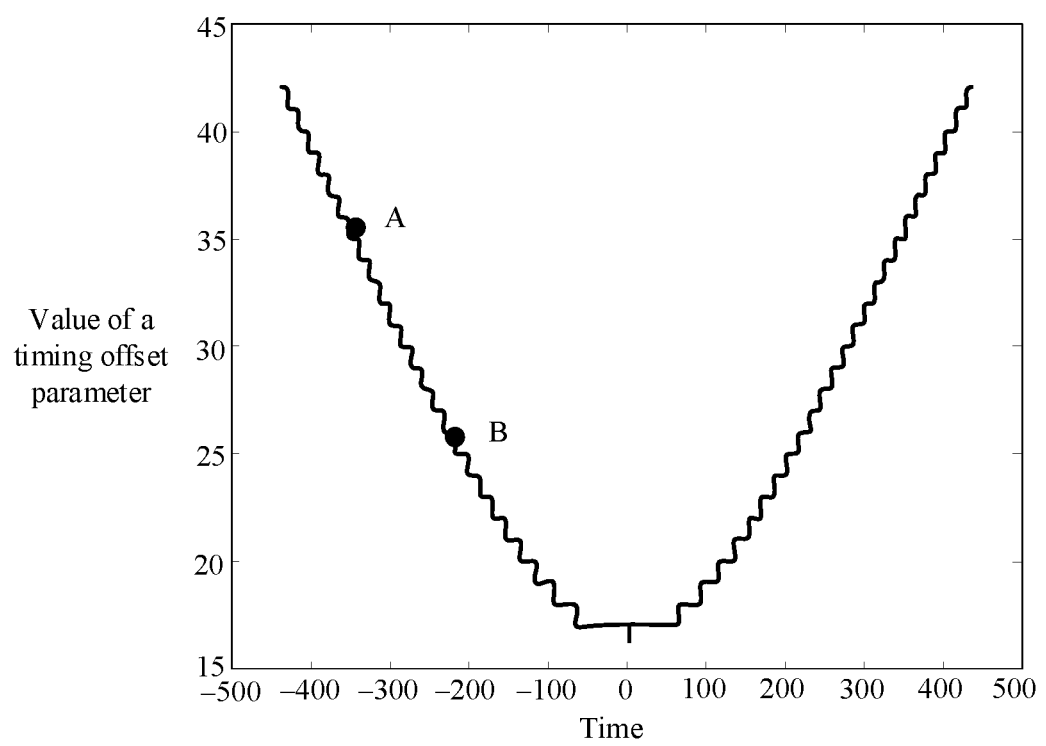
Figure 5:
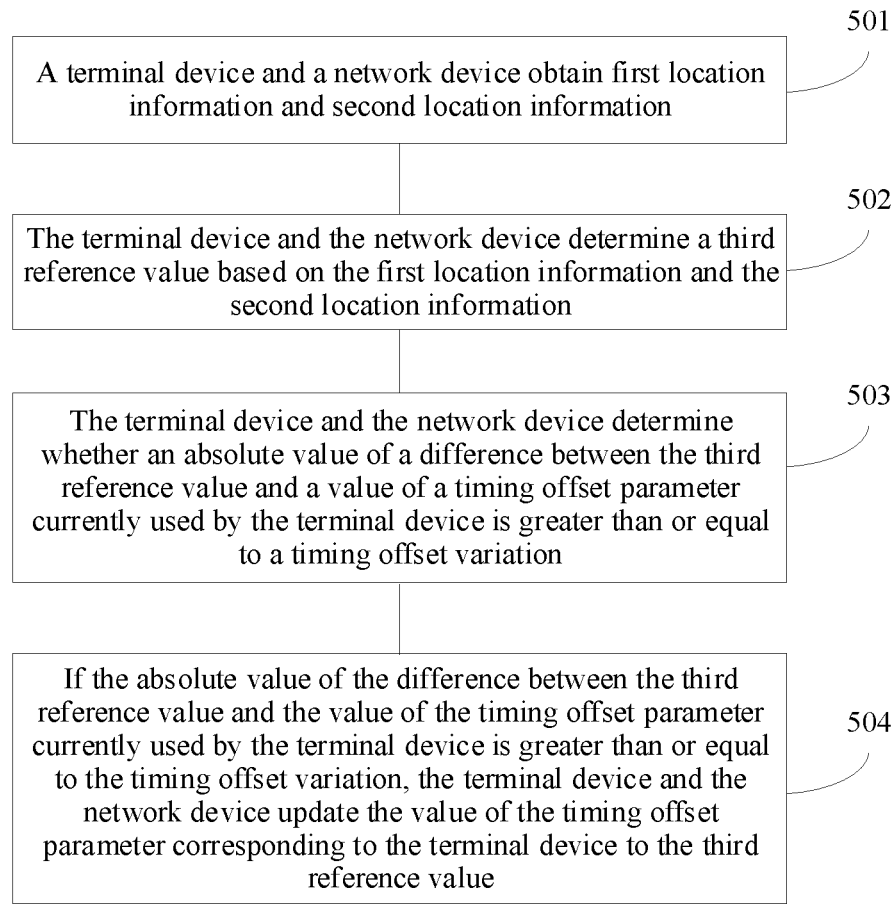
Figure 6:
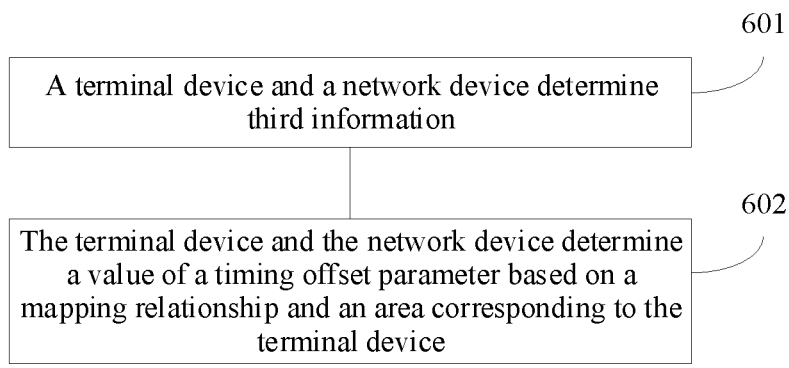
Figure 7:
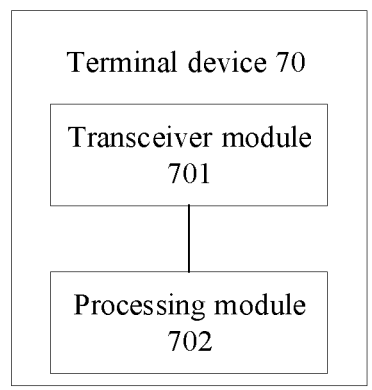
Figure 8:
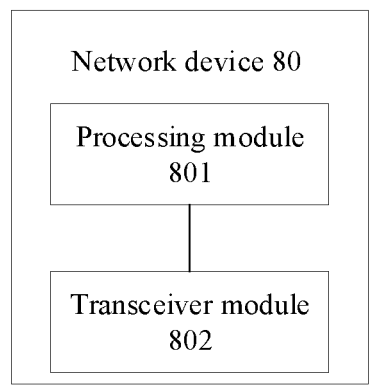

FIG. if is a schematic diagram of a correspondence between a communication elevation angle and a round trip delay according to an embodiment of this application;

FIG. 1g is a schematic diagram of a correspondence between a signal and a slot according to an embodiment of this application;

FIG. 1h is a schematic diagram of a correspondence between a signal and a slot according to an embodiment of this application;

FIG. 1i is a schematic diagram of a correspondence between a signal and a slot according to an embodiment of this application;

FIG. 1j is a schematic diagram of a correspondence between a signal and a slot according to an embodiment of this application;

FIG. 2 is a structural composition diagram of a communication apparatus according to an embodiment of this application;

FIG. 3 is a flowchart of a timing offset parameter update method according to an embodiment of this application;

FIG. 4 is a schematic diagram of a change curve of a value of a timing offset parameter according to an embodiment of this application;

FIG. 5 is a flowchart of a timing offset parameter update method according to an embodiment of this application;

FIG. 6 is a flowchart of a timing offset parameter update method according to an embodiment of this application;

FIG. 7 is a schematic structural diagram of a terminal device according to an embodiment of this application; and FIG. 8 is a schematic structural diagram of a network device according to an embodiment of this application.

DESCRIPTION OF EMBODIMENTS

Before embodiments of this application are described, technical terms used in embodiments of this application are described.

A beam is a shape formed on a surface of the earth by electromagnetic waves emitted by a satellite antenna.

A cell is an area in which a communication service may be provided for a terminal device. Specifically, in a communication system, a sector corresponding to a network device may be divided into different cells based on different carriers.

A preset delay may be a preset delay between a time point at which the terminal device receives a downlink signal sent by the network device and a time point at which the terminal device feeds back an uplink signal corresponding to the downlink signal to the network device, such as the preset delay described in any one of the example 1 to the example 7 below. Alternatively, a preset delay may be a preset delay between a time point at which the network device receives an uplink signal that is corresponding to a downlink signal and that is fed back by the terminal device and a time point at which the network device assumes that the terminal device takes effect on the downlink signal, such as the preset delay described in the example 8 below.

Example 1: Assuming that the terminal device receives, in a downlink slot n, physical downlink shared channel (PDSCH) data or semi-persistent scheduling (SPS) PDSCH data sent by the network device by using downlink control information (DCI), the terminal device may feed back a hybrid automatic repeat request acknowledgment (HARQ-ACK) instruction or a NACK instruction corresponding to the PDSCH data to the network device in a slot n+k1 of a physical uplink control channel (PUCCH).

k1 is a preset delay, and k1≤15. Specifically, the terminal device may determine k1 based on a PDSCH-to-HARQ timing instruction (PDSCH-to-HARQ-timing-indicator) index table in the DCI, and the network device may send the index table to the terminal device by using downlink data to uplink acknowledgment (DL-data to UL-ACK) signaling.

Example 2: Assuming that the terminal device receives, in a downlink slot n, uplink grant/scheduling information sent by the network device by using DCI, the terminal device may feed back physical uplink shared channel (PUSCH) data to the network device in a slot $$\left\lfloor n \cdot \frac{2^{\mu PUSCH}}{2^{\mu PDCCH}} \right\rfloor + k2$$

A length of k2 slots is a preset delay. µPUSCH is related to a subcarrier spacing of a PUSCH, that is, the subcarrier spacing of the PUSCH is $2^{\mu PUSCH}*15$ KHz. µPDCCH is related to a subcarrier spacing of a PDCCH, that is, the subcarrier spacing of the PDCCH is $2^{\mu PDCCH}*15$ KHz, where k2=0, ..., 32. Specifically, the network device may indicate a specific value of k2 to the terminal device by using DCI.

Example 3: Assuming that the terminal device receives, in a downlink slot n, configured grant signaling sent by the network device, the terminal device may send physical uplink shared channel (PUSCH) data to the network device in a slot n+y of a PUCCH.

A length of y slots is a preset delay.

Example 4: Assuming that the terminal device receives, in a downlink slot n, PDSCH data that is sent by the network device and that carries a random access response (RAR) message, the terminal device may feed back a random access message 3 to the network device in a slot n+k2+Δ of a PUCCH.

k2+Δ is a preset delay. Specifically, the network device may indicate a specific value of k2 to the terminal device by using DCI, and Δ may be pre-specified in a communication protocol.

Example 5: Assuming that the terminal device receives, in a downlink slot n, a channel state information (CSI) request sent by the network device by using DCI, the terminal device may feed back CSI to the network device in a slot n+k2 of a PUCCH.

k2 is a preset delay. Specifically, the network device may indicate a specific value of k2 to the terminal device by using DCI.

Example 6: Assuming that the terminal device needs to send a CSI report to the network device in a slot n' of a PUCCH, the network device needs to send a CSI reference resource to the terminal device in a downlink slot n-$n_{CSI\text{-}ref}$.

n=

$$\left\lfloor n' \cdot \frac{2^{\mu DL}}{2^{\mu UL}} \right\rfloor.$$

A specific value of $n_{CSI\text{-}ref}$ may be a value that is pre-specified in a communication protocol and that is related to a CSI report type. µDL is related to a subcarrier spacing of a DL, that is, the subcarrier spacing of the DL is $2^{\mu}_{DL}*15$ KHz. µUL is related to a subcarrier spacing of a UL, that is, the subcarrier spacing of the UL is $2^{\mu}_{UL}*15$ KHz.

Example 7: Assuming that the terminal device receives, in a downlink slot n, a DCI instruction that is sent by the network device and that triggers an aperiodic sounding reference signal (SRS), each time the terminal device feeds back an SRS signal to the network device in a slot $$\left\lfloor n \cdot 2^{\frac{\mu SRS}{\mu PDCCH}} \right\rfloor + k$$

of a PUCCH after an SRS resource group is triggered.

k is a preset delay. µ SRS is related to a subcarrier spacing of the SRS, that is, the subcarrier spacing of the SRS is $2^{\mu SRS}*15$ KHz. µPDCCH is related to a subcarrier spacing of a PDCCH, that is, the subcarrier spacing of the PDCCH is $2^{\mu PDCCH}*15$ KHz. A specific value of k is configured by using a higher layer parameter slot offset that triggers the SRS resource group each time.

Example 8: An example in which the network device sends, to the terminal device, PDSCH data that carries a medium access control control element (MAC CE) instruction and the network device receives, in a slot n of a PUCCH, a HARQ-ACK fed back by the terminal device to the network device is used. The MAC CE instruction is used to configure a downlink signal. In this case, it may be assumed that the MAC CE instruction of the terminal device for a downlink configuration takes effect in the first slot after a downlink slot n+$XN_{slot}^{subframe,\mu}$ $XN_{slot}^{subframe,\mu}$ is a preset delay. X may be a non-negative integer that is pre-specified in a communication protocol or that is configured by the network device by using a higher layer parameter. $N_{slot}^{subframe,\mu}$ is a quantity of slots included in one subframe when a subcarrier spacing is $2^{\mu}*15$ KHz.

Specifically, a downlink signal configuration instruction of the MAC CE instruction carried in the PDSCH data may be a resource configuration of a downlink zero power channel state information reference signal (ZP CSI-RS), or may be a resource configuration of deactivating (deactivation) a downlink ZP CSI-RS that has taken effect. This is not limited.

The following describes implementations of embodiments of this application in detail with reference to the accompanying drawings in this specification.

A timing offset parameter update method provided in embodiments of this application may be used in any communication system. The communication system may be a third generation partnership project (3GPP) communication system, for example, a long term evolution (LTE) system, or may be a fifth generation (5G) mobile communication system, a new radio (NR) system, or an NR V2X system, or may be a system of hybrid networking of LTE and 5G, a device-to-device (D2D) communication system, a machine-to-machine (M2M) communication system, the internet of things (IoT), and another next-generation communication system, or may be a non-3GPP communication system. This is not limited.

The timing offset parameter update method provided in embodiments of this application may be used in a communication scenario in which a distance between a terminal device and a network device constantly changes.

The following uses FIG. 1a as an example to describe the timing offset parameter update method provided in embodiments of this application.

FIG. 1a is a schematic diagram of a communication system according to an embodiment of this application. As shown in FIG. 1a, the communication system may be a non-terrestrial network (NTN) communication system, and the NTN communication system may include at least one terminal device and at least one network device.

The terminal device in FIG. 1a may be located in a beam/cell coverage area of the network device. The terminal device may perform air interface communication with the network device through an uplink (UL) or a downlink (DL). For example, the terminal may send uplink data to the network device in a UL direction through an uplink physical shared channel (PUSCH), and the network device may send downlink data to the terminal device in a DL direction through a downlink physical shared channel (PDSCH).

The terminal device (terminal) in FIG. 1a may be referred to as user equipment (UE), a mobile station (MS), a mobile terminal (MT), or the like. Specifically, the terminal device in FIG. 1a may be a mobile phone, a tablet computer, or a computer with a wireless transceiver function. Alternatively, the terminal device may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, a vehicle having a vehicle-to-vehicle (V2V) communication capability, an intelligent connected vehicle, an uncrewed aerial vehicle having a UAV-to-UAV (UAV-to-UAV, U2U) communication capability, or the like. This is not limited.

The network device in FIG. 1a may include an access network device and a flight platform. The access network device may be carried on the flight platform; the access network device may be carried on the flight platform in a distributed manner based on a distributed unit (DU); or the access network device may be disposed on the ground, and the terminal device and the access network device may communicate with each other by forwarding a signal through the flight platform.

For example, referring to FIG. Tb, when the access network device is carried on the flight platform, the communication system shown in FIG. 1a may be the communication architecture shown in FIG. Tb. As shown in FIG. Tb, the access network device moves synchronously with the flight platform, and the access network device and the flight platform may be considered as a whole. In this case, the flight platform may be considered as an access network device, or may be described as that the flight platform works in a regenerative mode, that is, the flight platform has a function of the access network device. In addition, a communication link between the flight platform and the terminal device may be referred to as a service link.

Refer to FIG. Tc. When the access network device is carried on the flight platform in the distributed manner based on the DU, the communication system shown in FIG. 1a may be the communication architecture shown in FIG. Tc. As shown in FIG. Tc, the access network device may include an access network device DU and an access network device central unit (CU). The access network device DU may be carried on the flight platform, the access network device CU may be disposed on the ground, and the terminal device may establish a communication connection to the access network device CU through the access network device DU. In this case, the flight platform may be considered as a part of the access network device, or may be described as that the flight platform works in a regenerative mode (regenerative), that is, the flight platform has a part of functions of the access network device. Similarly, FIG. Tb also shows the regenerative mode. In addition, a communication link between the flight platform and the terminal device may be referred to as a service link, and a communication link between the flight platform and the access network device CU may be referred to as a feeder link. It should be noted that the communication architecture in FIG. 1c may be considered as a special case of the communication architecture shown in FIG. Tb. In FIG. Tc, the access network device CU may also be described as a gateway, a ground station, or the like. This is not limited.

Refer to FIG. 1d. When the access network device is disposed on the ground, the communication system shown in FIG. 1a may be the communication architecture shown in FIG. 1d. As shown in FIG. 1d, the terminal device and the access network device may communicate with each other by forwarding a signal through the flight platform. Specifically, the flight platform may provide a transmission/reception point (TRP) for wireless access for the terminal device, and the TRP may transparently transmit data between the terminal device and the access network device, to implement a communication connection between the terminal device and the access network device. In this case, it may be described as that the flight platform works in a transparent transmission mode (transparent). In addition, a communication link between the flight platform and the terminal device may be referred to as a service link, and a communication link between the flight platform and the access network device may be referred to as a feeder link. It should be noted that the access network device may also be described as a gateway, a ground station, or the like. This is not limited.

The access network device may be any device that has a wireless transceiver function, and is mainly configured to implement functions such as a wireless physical control function, resource scheduling and radio resource management, radio access control, and mobility management. Specifically, the network device may be a device supporting wired access, or may be a device supporting wireless access. For example, the network device may be an access network (AN)/radio access network (RAN) device, where the AN/RAN device includes a plurality of 5G-AN/5G-RAN nodes. A 5G-AN/5G-RAN node may be an access point (AP), a NodeB (NB), an enhanced NodeB (eNB), a next-generation NodeB (NR NodeB, gNB), a transmission reception point (TRP), a transmission point (TP), another access node, or the like.

The flight platform may be an aerial vehicle such as a satellite or an uncrewed aerial vehicle. For example, based on a height of the flight platform, the flight platform may include a low-orbit satellite, a medium-orbit satellite, a geosynchronous-orbit satellite, an unmanned flight system platform, or a high-orbit satellite.

Alternatively, the communication system in FIG. 1a may be an air-to-ground (ATG) communication system, and the ATG communication system may include at least one terminal device and at least one network device.

Specifically, as shown in FIG. 1e, the terminal device may continuously move at heights (for example, 6 km to 12 km). The network device may be an access network device disposed on the ground, and the access network device may transmit a wireless network signal at heights, to provide a communication service for the terminal device located in a beam/cell corresponding to the access network device. The terminal device may be a device that can move at heights, such as an uncrewed aerial vehicle or an airplane. For example, a diameter of the beam/cell corresponding to the access network device may be 100 km to 300 km.

In addition, in FIG. 1b to FIG. 1e, the communication system may further include a core network device and a data network (DN), and the terminal device may communicate with the data network through the network device and the core network device.

The core network device may be configured to send, to the data network, data of the terminal device sent by the network device. Specifically, the core network device may include network elements such as a mobility management network element, a session management network element, a policy control network element, a user plane network element, and an application function network element. This is not limited.

The data network may be an operator network that provides a data transmission service for the terminal device, for example, may be an operator network that provides an IP multimedia service (IMS) for the terminal device. An application server (AS) may be deployed in the DN, and the application server may provide a data transmission service for the terminal device.

Compared with a distance between a network device and a terminal device in a terrestrial network (TN) communication system, a distance between the network device and the terminal device in the NTN communication system is large (generally greater than 500 km), round trip delays corresponding to terminal devices in a same beam/cell in the NTN communication system and a difference between the round trip delays corresponding to the terminal devices are far greater than round trip delays corresponding to terminal devices in a same cell in the TN communication system and a difference between the round trip delays corresponding to the terminal devices.

A round trip delay (RTD) corresponding to the terminal device may be a sum of transmission duration for sending a signal by the network device to the terminal device and transmission duration for sending a signal by the terminal device to the network device. Alternatively, it may be described as a quotient of twice a distance between the network device and the terminal device and a signal transmission speed. This is not limited. Specifically, the signal transmission speed may be a speed of light.

Specifically, when the communication system is the communication system shown in FIG. 1b, a round trip delay corresponding to the terminal device may be a quotient of twice a distance between the terminal device and the flight platform and a signal transmission speed. When the communication system is the communication system shown in FIG. 1c, a round trip delay corresponding to the terminal device may be a sum of a quotient of twice a distance between the terminal device and the flight platform and a signal transmission speed and a quotient of twice a distance between the flight platform and the access network device CU and the signal transmission speed. When the communication system is the communication system shown in FIG. 1d, a round trip delay corresponding to the terminal device may be a sum of a quotient of twice a distance between the terminal device and the flight platform and a signal transmission speed and a quotient of twice a distance between the flight platform and the access network device and the signal transmission speed. When the communication system is the communication system shown in FIG. 1e, a round trip delay corresponding to the terminal device may be a quotient of twice a distance between the terminal device and the access network device and a signal transmission speed.

For example, a diameter of a cell in the TN communication system is 350 km, and a largest round trip delay corresponding to a terminal device in the cell may be 1.17 ms. The network device in FIG. 1b is used as an example. When a satellite orbit height in the NTN is 600 km and a beam diameter is 350 km, as shown in FIG. 1f, when a communication elevation angle of a terminal device in a beam/cell corresponding to the network device is 10 degrees, a round trip delay corresponding to the terminal device is largest. In this case, the largest round trip delay may reach about 13 ms. The communication elevation angle of the terminal device may be an included angle between a straight line formed by the terminal device and the network device and a straight line formed by the terminal device and a center of the beam/cell.

Because the round trip delay corresponding to the terminal device in the NTN is large, to avoid interference between different terminal devices in a cell, the network device may send a timing advance (TA) adjustment amount to the terminal device based on the round trip delay corresponding to the terminal device, as shown in FIG. 1g. The terminal device may send an uplink signal in advance based on the timing advance adjustment amount sent by the network device, so that uplink signals sent by a plurality of terminal devices reach the network device at basically the same timing, thereby avoiding interference between different terminal devices in the cell. The timing advance adjustment amount of the terminal device is less than or equal to the round trip delay corresponding to the terminal device.

Specifically, after receiving a downlink signal sent by the network device, the terminal device may perform timing advance adjustment based on the foregoing preset delay and the timing advance adjustment amount, so that when the uplink signal sent by the terminal device reaches the network device, timing of the uplink signal is basically the same as that of the downlink signal.

However, because the round trip delay corresponding to the terminal device is large, the timing advance adjustment amount that is determined by the network device for the terminal device based on the round trip delay corresponding to the terminal device is also large. When the timing advance adjustment amount of the terminal device is greater than the preset delay, the terminal device cannot send the uplink signal to the network device based on the timing advance adjustment amount.

For example, the foregoing example 1 is used as an example. As shown in (a) in FIG. 1h, assuming that the terminal device receives PDSCH data in a downlink slot n, the terminal device may feed back a HARQ-ACK to the network device in a slot n+k1 of a PUCCH. That is, a maximum value of timing advance adjustment that can be performed by the terminal device is a length of k1 slots. Because a maximum value of k1 is 15, assuming that a subcarrier spacing (SCS) is 30 kHz, and a length of a slot is 0.5 ms, a maximum value of timing advance adjustment that can be performed by the terminal device is 7.5 ms. It can be learned from FIG. if that the round trip delay corresponding to the terminal device in the beam or the cell in the NTN is far greater than 7.5 ms. Therefore, the length of the k1 slots cannot provide a sufficient time length for the terminal device to perform timing advance adjustment. In other words, when the timing advance adjustment amount of the terminal device is greater than the preset delay, the terminal device cannot send the uplink signal to the network device based on the timing advance adjustment amount.

To avoid a case in which the terminal device cannot send the uplink signal based on the timing advance adjustment amount because the timing advance adjustment amount of the terminal device is greater than the preset delay, a timing offset parameter is introduced. The network device sends a value of the timing offset parameter to the terminal device, so that the terminal device has sufficient time to perform timing advance adjustment based on the preset delay and the value of the timing offset parameter after receiving the downlink signal. The value of the timing offset parameter is greater than or equal to the timing advance adjustment amount.

For example, the foregoing example 1 is used as an example. As shown in (b) in FIG. 1h, the network device may determine a value $k_{offset}$ of the timing offset parameter based on the timing advance adjustment amount of the terminal device, and send the value of the timing offset parameter to the terminal device. Assuming that the terminal device receives PDSCH data in a downlink slot n, the terminal device may perform timing advance adjustment based on the timing advance adjustment amount and a slot $n+k1+k_{offset}$ of a PUCCH, to feed back a HARQ-ACK to the network device. In this way, it is ensured that the terminal device can have sufficient time to perform timing advance adjustment.

For another example, the foregoing example 2 is used as an example. As shown in (a) in FIG. 1i, assuming that the terminal device receives, in a downlink slot n, uplink grant/scheduling information sent by the network device by using DCI, the terminal device may perform timing advance adjustment based on a preset delay k2 and the timing advance adjustment amount sent by the network device, and feed back PUSCH data to the network device.

However, when the timing advance adjustment amount of the terminal device is greater than the preset delay, the terminal device cannot feed back the PUSCH data to the network device based on the timing advance adjustment amount. In this case, as shown in (b) in FIG. 1i, the network device may determine, based on the round trip delay corresponding to the terminal device, a value $k_{offset}$ of the timing offset parameter corresponding to the terminal device, and send the value of the timing offset parameter to the terminal device. Assuming that the terminal device receives, in a downlink slot n, uplink grant/scheduling information sent by the network device by using DCI, the terminal device may perform timing advance adjustment based on the timing advance adjustment amount and a slot, $$\left\lfloor n \cdot \frac{2^{\mu PUSCH}}{2^{\mu PDCCH}} \right\rfloor + k2 + k_{offset}$$

of a PUCCH, to feed back PUSCH data to the network device. In this way, it is ensured that the terminal device can have sufficient time to perform timing advance adjustment.

For another example, for the foregoing example 3, the terminal device may perform timing advance adjustment based on the timing advance adjustment amount and a slot n+y+k$_{offset}$ of a PUCCH, to feed back PUSCH data to the network device. In this way, it is ensured that the terminal device can have sufficient time to perform timing advance adjustment. For the foregoing example 4, the terminal device may perform timing advance adjustment based on the timing advance adjustment amount and a slot n+k2+Δ+k$_{offset}$ of a PUCCH, to feed back a random access message 3 to the network device. In this way, it is ensured that the terminal device can have sufficient time to perform timing advance adjustment. For the foregoing example 5, the terminal device may perform timing advance adjustment based on the timing advance adjustment amount and a slot n+k2+k$_{offset}$ of a PUCCH, to feed back CSI to the network device. In this way, it is ensured that the terminal device can have sufficient time to perform timing advance adjustment. For the foregoing example 6, the network device may send a CSI reference resource to the terminal device in a downlink slot n-n$_{CSI-ref}$-k$_{offset}$, so that after receiving the CSI reference resource, the terminal device may perform timing advance adjustment based on the timing advance adjustment amount, to feed back a CSI report to the network device. In this way, it is ensured that the terminal device can have sufficient time to perform timing advance adjustment. For the foregoing example 7, the terminal device may perform timing advance adjustment based on the timing advance adjustment amount and a slot $$\left\lfloor n \cdot 2^{\frac{\mu SRS}{\mu PDCCH}} \right\rfloor + k + k_{offset}$$

of a PUCCH, to feed back an SRS signal to the network device. In this way, it is ensured that the terminal device can have sufficient time to perform timing advance adjustment. For the foregoing example 8, when the network device sends, to the terminal device, PDSCH data carrying a MAC CE instruction, and receives, in a slot n of a PUCCH, a HARQ-ACK fed back by the terminal device to the network device, it may be assumed that the MAC CE instruction of the terminal device for a downlink configuration takes effect in the first slot after a downlink slot n+XN$_{slot}^{subframe,\mu}$+k$_{offset}$.

Because the network device in the NTN has mobility, as the network device continuously moves, the distance between the network device and the terminal device continuously changes, and the round trip delay of the terminal device also changes accordingly. The network device may adjust the timing advance adjustment amount of the terminal device based on the round trip delay of the terminal device. In addition, the network device may also update the value of the timing offset parameter based on the round trip delay of the terminal device, to avoid a large scheduling delay corresponding to the terminal device due to an excessively large value of the timing offset parameter and avoid reducing transmission efficiency.

For example, in an LEO-1200 gaze mode scene, (that is, when a minimum communication elevation of the terminal device is 10 degrees) It is assumed that a subcarrier spacing is 30 kHz and a slot length is 0.5 ms. As the network device moves, a communication elevation angle between the terminal device and the network device changes (which may also be described as that a distance between the terminal device and the network device changes). A serving link between the terminal device and the network device is used as an example. A change range of a round trip delay corresponding to the terminal device may be 8 ms to 20.872 ms. For example, a change range of a value, of a timing offset parameter, configured by the network device for the terminal device is 16 to 42. To ensure smooth communication between the terminal device and the network device, the value of the timing offset parameter corresponding to the terminal device may be set to a maximum value 42. Even if the distance between the terminal device and the network device changes, a communication connection between the terminal device and the network device is not affected. However, if the value of the timing offset parameter is always large, a scheduling delay corresponding to the terminal device in the communication system is always large, and transmission efficiency is reduced.

Therefore, the network device may determine a new value of the timing offset parameter for the terminal device based on a location relationship between the terminal device and the network device or based on a timing advance adjustment amount used by the terminal device, that is, update the value of the timing offset parameter corresponding to the terminal device, and send an updated value of the timing offset parameter to the terminal device, to prevent transmission efficiency from being affected by an excessively large scheduling delay corresponding to the terminal device in the communication system.

For example, as shown in (a) in FIG. 1*j*, when a time length indicated by the value, of the timing offset parameter, configured by the network device for the terminal device is far greater than a time length indicated by the timing advance adjustment amount, a large scheduling delay is generated when the network device sends a downlink signal to the terminal device, to schedule the terminal device to send an uplink signal corresponding to the downlink signal to the network device. As shown in (b) in FIG. 1*j*, when the network device reduces the value of the timing offset parameter corresponding to the terminal device, for example, adjusts a time length indicated by the value of the timing offset parameter to be close to a time length indicated by the timing advance adjustment amount, a scheduling delay can be reduced, and transmission efficiency can be improved.

However, when continuously updating the value of the timing offset parameter corresponding to the terminal device in a running process based on a location relationship between the terminal device and the network device or based on the timing advance adjustment amount used by the terminal device, the network device needs to continuously configure an updated value of the timing offset parameter for the terminal device by using signaling. Consequently, signaling overheads of the network device are high.

To resolve this problem, an embodiment of this application provides a timing offset parameter update method. A terminal device may obtain first information that includes a first reference value and first indication information, where the first indication information indicates an update rule of a timing offset parameter, and the first reference value is an initial value of the timing offset parameter; and update a value of the timing offset parameter based on the first information and a timing offset variation, to obtain an updated value of the timing offset parameter, where an absolute value of the timing offset variation is equal to an absolute value of a difference between any two consecutively updated values of the timing offset parameter. The terminal device may automatically update the value of the timing offset parameter according to the update rule of the timing offset parameter indicated by the first indication information and based on the first reference value and the timing offset variation, and a network device does not need to continuously update the value of the timing offset parameter and deliver the value to the terminal device by using signaling. Therefore, signaling overheads of the network device are reduced.

During specific implementation, as shown in FIG. 1a, for example, each terminal device and each network device may use a composition structure shown in FIG. 2, or include components shown in FIG. 2. FIG. 2 is a schematic diagram of composition of a communication apparatus 200 according to an embodiment of this application. The communication apparatus 200 may be a terminal device, or a chip or a system on chip in the terminal device; or may be a network device, or a chip or a system on chip in the network device. As shown in FIG. 2, the communication apparatus 200 includes a processor 201, a transceiver 202, and a communication line 203.

Further, the communication apparatus 200 may further include a memory 204. The processor 201, the memory 204, and the transceiver 202 may be connected through the communication line 203.

The processor 201 is a central processing unit (CPU), a general-purpose processor, a network processor (NP), a digital signal processor (digital signal processing, DSP), a microprocessor, a microcontroller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communication network. The another communication network may be the Ethernet, a radio access network (RAN), a wireless local area network (WLAN), or the like. The transceiver 202 may be a module, a circuit, a transceiver, or any apparatus that can implement communication.

The communication line 203 is configured to transmit information between the components included in the communication apparatus 200.

The memory 204 is configured to store instructions. The instructions may be a computer program.

The memory 204 may be a read-only memory (ROM) or another type of static storage device that can store static information and/or instructions, may be a random access memory (RAM) or another type of dynamic storage device that can store information and/or instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or the like. This is not limited.

It should be noted that the memory 204 may be independent of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement a timing offset parameter update method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an optional implementation, the communication apparatus 200 further includes an output device 205 and an input device 206. For example, the input device 206 is a device, for example, a keyboard, a mouse, a microphone, or a joystick, and the output device 205 is a device, for example, a display or a speaker.

It should be noted that the communication apparatus 200 may be a desktop computer, a portable computer, a network server, a mobile phone, a tablet computer, a wireless terminal, an embedded device, a chip system, or a device having a structure similar to a structure in FIG. 2. In addition, the composition structure shown in FIG. 3 does not constitute a limitation on the communication apparatus. In addition to the components shown in FIG. 2, the communication apparatus may include more or fewer components than those shown in the figure, some components may be combined, or different component arrangements may be used.

In embodiments of this application, the chip system may include a chip, or may include a chip and another discrete component.

In addition, for actions, terms, and the like in embodiments of this application, refer to each other. This is not limited. In embodiments of this application, names of messages exchanged between devices, names of parameters in the messages, or the like are merely examples. Other names may alternatively be used during specific implementation. This is not limited.

With reference to the communication system shown in FIG. 1a, the following describes a timing offset parameter update method provided in embodiments of this application. A terminal device may be any terminal device in the communication system, and a network device may be any network device that communicates with the terminal device in the communication system. Both the terminal device and the network device in the following embodiments may have the components shown in FIG. 2.

FIG. 3 is a flowchart of a timing offset parameter update method according to an embodiment of this application. As shown in FIG. 3, the method may include the following steps.

Step 301: A network device sends first information to a terminal device. Correspondingly, the terminal device receives the first information.

The first information may include a first reference value and first indication information, and the first indication information indicates an update rule of a timing offset parameter.

For example, the network device may determine, based on location information of the terminal device at a moment, location information of the network device at the moment, and a timing compensation value of the network device for an uplink signal sent by the terminal device, a value of a timing offset parameter corresponding to the terminal device at the moment. The network device may determine, based on values of the timing offset parameter corresponding to the terminal device at a plurality of consecutive moments, a change curve of the timing offset parameter corresponding to the terminal device, and determine the first reference value and the first indication information based on the curve.

Specifically, the network device may receive the location information of the terminal device sent by the terminal device.

For example, the terminal device may determine the location information of the terminal device based on a positioning unit of the terminal device, and send the location information to the network device. The positioning unit may be a positioning unit that can position the terminal device, such as a global positioning system (GPS) unit or a BeiDou navigation satellite system (BDS) unit. This is not limited.

Specifically, when the network device includes a flight platform and an access network device, the location information of the network device may include location information of the flight platform and location information of the access network device. When the access network device is disposed on the flight platform, the location information of the network device includes the location information of the flight platform.

The location information of the flight platform may be ephemeris information. The ephemeris information may be a precise location or track table indicating that running of a space flight body (for example, the flight platform) changes with time, and is used to describe a location and a speed of the space flight body. For example, various parameters such as time, the location, and the speed of the space flight body may be determined based on the ephemeris information by using a mathematical relationship between six orbital parameters of the Kepler's law.

It should be noted that for specific descriptions of determining the location information of the space flight object by the network device based on the ephemeris information, refer to a conventional technology. Details are not described again.

Optionally, after receiving the location information sent by the terminal device, the network device determines, based on the location information sent by the terminal device, the location information that is of the network device at the same moment and that is corresponding to the location information of the terminal device.

Specifically, the timing compensation value indicates a delay of receiving the uplink signal from the terminal device by the network device, that is, a timing delay of receiving the uplink signal by the network device. The timing compensation value may be pre-specified in a communication protocol, or may be a variable value determined by the network device. This is not limited. The network device may configure the timing compensation value for the terminal device. Optionally, the timing compensation value is 0.

Specifically, the network device may determine, based on location information of the terminal device and location information of the network device at a moment, a difference between a quotient of twice a distance between the terminal device and the network device at the moment and a signal transmission speed and the timing compensation value as a value of the timing offset parameter corresponding to the terminal device at the moment, that is, value of the timing offset parameter=2D/v−timing compensation value, where D is the distance between the terminal device and the network device, and v is the signal transmission speed. The distance between the terminal device and the network device includes a distance between the terminal device and the flight platform and a distance between the flight platform and the access network device. When the access network device is disposed on the flight platform, the distance between the terminal device and the network device includes the distance between the terminal device and the flight platform.

It should be noted that, it may also be described as that the network device determines a difference between a round trip delay corresponding to the terminal device at a moment and the timing compensation value as a value of the timing offset parameter corresponding to the terminal device at the moment, that is, value of the timing offset parameter−RTD (terminal device, network device)−timing compensation value. RTD (terminal device, network device) indicates a round trip delay between the terminal device and the network device. The round trip delay corresponding to the terminal device includes a round trip delay between the terminal device and the flight platform and a round trip delay between the flight platform and the access network device. When the access network device is disposed on the flight platform, the round trip delay corresponding to the terminal device includes the round trip delay between the terminal device and the flight platform.

Further, the network device may further determine, based on the location information of the terminal device, the location information of the network device, the timing compensation value, and a first magnitude, the value of the timing offset parameter corresponding to the terminal device.

The first magnitude may be a first magnitude determined by the network device based on a processing delay of the network device or the terminal device, an effective delay of an updated value of the timing offset parameter of the network device and the terminal device, an error of the distance between the network device and the terminal device, and/or the like, to reduce an error and improve reliability of a communication system. Specifically, the first magnitude may be a time magnitude (for example, 0.5 ms) or a value (for example, −1, 1.22, or 3). The first magnitude may be a fixed value pre-specified in the communication protocol, or may be a value configured by the network device for the terminal device. This is not limited.

Specifically, the network device may determine, based on the location information of the terminal device and the location information of the network device at the moment, a sum of the first magnitude and the difference between the quotient of twice the distance between the terminal device and the network device at the moment and the signal transmission speed and the timing compensation value as a value of the timing offset parameter corresponding to the terminal device at the moment, that is, value of the timing offset parameter=2D/v−timing compensation value+first magnitude.

It should be noted that, it may also be described as that the network device determines a sum of the first magnitude and the difference between the round trip delay corresponding to the terminal device at the moment and the timing compensation value as a value of the timing offset parameter corresponding to the terminal device at the moment, that is, value of the timing offset parameter=RTD (terminal device, network device)−timing compensation value+first magnitude.

Specifically, the network device may determine, based on a value of the timing offset parameter corresponding to the terminal device in a period of time, a change curve of the timing offset parameter corresponding to the terminal device in the period of time.

Optionally, the network device determines, based on a movement periodicity of the network device, a change curve of the timing offset parameter corresponding to the terminal device in one movement periodicity.

For example, the network device periodically receives the location information sent by the terminal device. The network device may periodically determine the value of the timing offset parameter corresponding to the terminal device, and obtain the change curve of the timing offset parameter corresponding to the terminal device. For example, the change curve of the timing offset parameter corresponding to the terminal device shown in FIG. 4 may be obtained.

It should be noted that, when the distance between the network device and the terminal device becomes closer, the round trip delay corresponding to the terminal device becomes smaller, and the value that is of the timing offset parameter corresponding to the terminal device and that is determined by the network device becomes smaller. When the distance between the network device and the terminal device becomes longer, the round trip delay corresponding to the terminal device becomes larger, and the value that is of the timing offset parameter corresponding to the terminal device and that is determined by the network device becomes larger.

Specifically, after determining the change curve of the timing offset parameter corresponding to the terminal device, the network device may select any value of the timing offset parameter from the change curve as the first reference value, and predict, based on a future movement track of the network device and the change curve of the timing offset parameter corresponding to the terminal device, a change trend of the value of the timing offset parameter corresponding to the terminal device, to determine the first indication information.

Optionally, when sending the first indication information to the terminal device, the network device indicates the update rule of the timing offset parameter in an explicit indication manner.

For example, the network device may send the first indication information including the update rule to the terminal device.

The update rule indicates the terminal device to increase the value of the timing offset parameter or decrease the value of the timing offset parameter.

For example, FIG. 4 is used as an example. The network device may use a value of a timing offset parameter corresponding to a point A in the change curve shown in FIG. 4 as the first reference value, and determine, based on the change curve, that the value of the timing offset parameter should be decreased when the value of the timing offset parameter is subsequently updated. In this case, the network device may send, to the terminal device, the first reference value and the first indication information whose update rule is decreasing the value of the timing offset parameter.

For example, the network device may use one bit to indicate the update rule.

For example, when the bit is 0, it indicates that the update rule is increasing the value of the timing offset parameter, and when the bit is 1, it indicates that the value of the timing offset parameter is decreased; or when the bit is 1, it indicates that the update rule is increasing the value of the timing offset parameter, and when the bit is 0, it indicates that the value of the timing offset parameter is decreased. This is not limited.

Optionally, when sending the first indication information to the terminal device, the network device indicates the update rule of the timing offset parameter in an implicit indication manner.

For example, the network device may send the first indication information including a second reference value to the terminal device, to implicitly indicate the terminal device to update the value of the timing offset parameter toward a direction of the second reference value.

When the second reference value is greater than the first reference value, the first indication information may indicate to increase the value of the timing offset parameter. When the second reference value is less than the first reference value, the first indication information may indicate to decrease the value of the timing offset parameter.

For example, FIG. 4 is used as an example. The network device may use a value of a timing offset parameter corresponding to a point A in the change curve shown in FIG. 4 as the first reference value, use a value of the timing offset parameter corresponding to a point B as the second reference value, and send the first reference value and the second reference value to the terminal device. In this case, after receiving the first reference value and the second reference value, when updating the value of the timing offset parameter, the terminal device updates the value of the timing offset parameter from the first reference value toward the direction of the second reference value, that is, increases the value of the timing offset parameter when the second reference value is greater than the first reference value; or decreases the value of the timing offset parameter when the second reference value is less than the first reference value.

In another example, the network device may send the first indication information that includes a difference between the second reference value and the first reference value to the terminal device, to implicitly indicate the terminal device to update the value of the timing offset parameter toward a direction of the second reference value.

When the second reference value is greater than the first reference value, the first indication information indicates to increase the value of the timing offset parameter. When the second reference value is less than the first reference value, the first indication information indicates to decrease the value of the timing offset parameter.

Specifically, the network device may send, to the terminal device, a difference obtained by subtracting the first reference value from the second reference value, or may send, to the terminal device, a difference obtained by subtracting the second reference value from the first reference value.

When the first indication information sent by the network device to the terminal device is a difference obtained by subtracting the first reference value from the second reference value, and if the difference is positive, the terminal device is indicated to increase the value of the timing offset parameter when updating the value of the timing offset parameter; or if the difference is negative, the terminal device is indicated to decrease the value of the timing offset parameter when updating the value of the timing offset parameter.

When the first indication information sent by the network device to the terminal device is a difference obtained by subtracting the second reference value from the first reference value, and if the difference is positive, the terminal device is indicated to decrease the value of the timing offset parameter when updating the value of the timing offset parameter; or if the difference is negative, the terminal device is indicated to increase the value of the timing offset parameter when updating the value of the timing offset parameter.

In a possible design, the network device determines, for each terminal device, first information corresponding to the terminal device, and sends the first information corresponding to the terminal device to the terminal device.

In another possible design, the network device classifies terminal devices into different areas based on a preset condition, and sends same first information to terminal devices located in a same area, where different areas are corresponding to different first information.

Specifically, the network device sends the same first information to the terminal devices located in the same area, so that computing pressure brought because the network device determines the first information corresponding to the terminal device for each terminal device can be reduced, thereby reducing a processing burden of the network device. In addition, storage pressure and complexity brought because the network device stores the corresponding first information for each terminal can be reduced.

Optionally, the network device classifies terminal devices into different beams based on coverage areas of beams.

Optionally, the network device classifies terminal devices into different cells based on coverage areas of cells.

Optionally, the network device classifies terminal devices into different terminal device groups based on distances between the terminal devices. A distance between any two terminal devices in a same terminal device group is less than or equal to a third threshold. Optionally, the third threshold is 0 or 3.

Specifically, first information corresponding to an area may be first information corresponding to a reference point corresponding to the area, and the reference point may be any point in a coverage area corresponding to a beam or a cell corresponding to the area.

For example, an area corresponds to a beam. The reference point may be any point in a ground area covered by the beam, may be any point in an air area covered by the beam, or may be a flight platform in the network device. This is not limited.

For example, when the reference point is any point in a ground area covered by the area, the reference point may be a point closest to the network device in the ground area, may be a point farthest from the network device in the ground area, or may be a center point of the ground area. This is not limited.

Specifically, the network device may determine, based on location information of the reference point in a period of time, location information of the network device, and a timing compensation value of the network device for an uplink signal sent at the reference point, a change curve of a timing offset parameter corresponding to the reference point in the period of time, and determine, based on the change curve, the first information corresponding to the reference point.

Specifically, the network device may send, in a broadcast manner, the first information corresponding to the reference point to a terminal device in the area corresponding to the reference point, or may send, in a unicast or multicast manner, the first information corresponding to the reference point to a terminal device in the area corresponding to the reference point. This is not limited.

For example, the network device may include the first information corresponding to the reference point in system information block (SIB) 1 signaling and send the system information block 1 signaling to a terminal device in the coverage area of the cell corresponding to the reference point; or the network device may include the first information corresponding to the reference point in a master information block (MIB) and send the master information block to a terminal device in the coverage area of the cell corresponding to the reference point; or the network device may include the first information corresponding to the reference point in other cell-level broadcast signaling and send the other cell-level broadcast signaling to a terminal device in the coverage area of the cell corresponding to the reference point. This is not limited.

For another example, when the terminal device and the network device are in a radio resource control (RRC) connection phase, the network device may include the first information in at least one of RRC information, an RRC reconfiguration message, DCI, group DCI, a MAC control element, or a timing advance command (TAC), or send the first information to the terminal device along with data transmission or on a separately allocated PDSCH.

Further, the network device may further send second information to the terminal device.

The second information may include one or more of the following: a first moment, an update interval, an update moment, or a quantity of update times.

The first moment may indicate a moment at which the terminal device starts to update the value of the timing offset parameter.

In an example, the first moment may be an absolute time amount.

For example, the first moment may be an absolute time amount determined by the network device based on universal time coordinated (UTC). The network device may indicate, by using the first moment, the terminal device to start to update the timing offset parameter at the first moment.

In another example, the first moment may be a relative time amount.

For example, the first moment may be a relative time amount such as a start of a frame or a start of a subframe in a frame. The network device indicates, by using the first moment, the terminal device to start to update the value of the timing offset parameter at a start location indicated by the first moment.

For another example, the first moment may alternatively indicate a length of a period of time. The network device indicates, by using the first moment, the terminal to start to update the timing offset parameter after a time length of the first moment from a time point at which the terminal receives the first moment. Alternatively, the network device may indicate, by using the first moment, the terminal to start to update the timing offset parameter after a time length of the first moment from a time point at which the terminal receives the first information.

The update interval may indicate a time interval between any two consecutive times of updating the value of the timing offset parameter by the terminal device.

Specifically, the network device may indicate, by sending the update interval to the terminal device, the terminal device to automatically update the timing offset parameter based on the time interval.

In an example, the network device may send an update interval to the terminal device, to indicate the terminal device to update the value of the timing offset parameter by using the update interval when updating the value of the timing offset parameter.

In another example, the network device may alternatively send two or more update intervals to the terminal device, and indicate action duration of each update interval, to indicate the terminal device to update the value of the timing offset parameter by using the update interval within the action duration of the update interval.

For example, the network device sends an update interval 1 and an update interval 2 to the terminal device, the update interval 1 is used in a time period t0 to t1, and the update interval 2 is used in a time period t1 to t2. After receiving the update intervals, the terminal device updates the value of the timing offset parameter by using the update interval 1 in the time period t0 to t1, and updates the value of the timing offset parameter by using the update interval 2 in the time period t1 to t2.

The update moment indicates a start moment at which the terminal device updates the value of the timing offset parameter.

Specifically, in addition to indicating, by using the update interval, the moment at which the terminal device updates the timing offset parameter, the network device may further indicate, to the terminal device, a specific moment at which the value of the timing offset parameter is updated.

For example, the update moment may be an absolute time amount, for example, UTC time t0, t1, . . . , tn; or may be a relative time amount, for example, a start of a frame, or a start of a subframe in a frame. For example, t0, t1, . . . , tn respectively represent a start of a frame 0, a start of a frame 1, . . . , and a start of a frame n. Alternatively, t0, t1, . . . , tn respectively represent a start of a subframe 0, a start of a subframe 1, . . . , a start of a subframe n of a frame. This is not limited.

It should be noted that the network device may properly determine the update moment based on the distance between the network device and the terminal device, or may determine the update moment based on another parameter. This is not limited.

The quantity of update times may indicate a quantity of times that the terminal device updates the value of the timing offset parameter.

Specifically, the network device sends the quantity of update times to the terminal device, so that the terminal device can update the value of the timing offset parameter based on the quantity of update times.

Further, when the first indication information includes the update rule, the update rule and the quantity of update times may be combined into one instruction, that is, a positive or negative sign may be set for the quantity of update times. When the quantity of update times is positive, it indicates that the update rule is increasing the value of the timing offset parameter; when the quantity of update times is negative, it indicates that the update rule is decreasing the value of the timing offset parameter; or when the quantity of update times is positive, it indicates that the update rule is decreasing the value of the timing offset parameter; when the quantity of update times is negative, it indicates that the update rule is increasing the value of the timing offset parameter. This is not limited.

For example, the network device may add one bit to signaling indicating the quantity of update times, to indicate the positive or negative sign of the quantity of update times.

It should be noted that when the quantity of times that the terminal device updates the value of the timing offset parameter meets the quantity of update times, the terminal device may stop updating the value of the timing offset parameter.

Further, the network device may further send second indication information to the terminal device, to indicate the terminal device to stop updating the value of the timing offset parameter. The second indication information indicates the terminal device to stop updating the value of the timing offset parameter.

For example, the second indication information may be 1-bit indication information. The network device may indicate, by setting the second indication information to 0, the terminal device to stop updating the value of the timing offset parameter, or may indicate, by setting the second indication information to 1, the terminal device to stop updating the value of the timing offset parameter.

In another example, the network device may indicate, by using a timing advance command (TAC), the terminal device to stop updating the value of the timing offset parameter. The TAC instruction may indicate a timing advance adjustment value by using six bits.

Specifically, the network device may set all the six bits of the TAC instruction to 0, to indicate the terminal device to stop updating the value of the timing offset parameter.

In another example, the second indication information may be a specific value of the timing offset parameter. The network device sets the second indication information to the specific value of the timing offset parameter, to indicate the terminal device to stop, when updating the value of the timing offset parameter, updating the value of the timing offset parameter when a difference between an updated value of the timing offset parameter and the specific value of the timing offset parameter is less than or equal to a fourth threshold. Optionally, the fourth threshold is 0.

For example, the second indication information sent by the network device to the terminal device is the value of the timing offset parameter=34. In this case, the second indication information indicates the terminal device to stop, when updating the timing offset parameter, updating the value of the timing offset parameter when an updated value of the timing offset parameter is 34.

Further, the network device may further send third indication information to the terminal device, to indicate the terminal device to update the value of the timing offset parameter. The third indication information is used by the terminal device to update the value of the timing offset parameter.

For example, the third indication information may be 1-bit indication information. The network device may indicate, by setting the third indication information to 0, the terminal device to update the value of the timing offset parameter, or may indicate, by setting the third indication information to 1, the terminal device to update the value of the timing offset parameter.

In another example, the third indication information may be an updated first reference value, updated first indication information, or updated second information. The network device may send the updated first reference value, the updated first indication information, or the updated second information to the terminal device, to indicate the terminal device to update the value of the timing offset parameter based on the updated first reference value, the updated first indication information, or the updated second information.

Step 302: The terminal device updates the value of the timing offset parameter based on the first information and a timing offset variation, to obtain an updated value of the timing offset parameter.

After receiving the first information, the terminal device may use the first reference value as the initial value of the timing offset parameter.

An absolute value of the timing offset variation is equal to an absolute value of a difference between any two consecutively updated values of the timing offset parameter. The timing offset variation may be pre-specified in the communication protocol, may be preconfigured by the network device for the terminal device, or may be configured by the network device for the terminal device together with the first information. This is not limited.

Specifically, the terminal device may update the timing offset parameter based on the first reference value and the timing offset variation and according to the update rule indicated by the first indication information.

For example, the first reference value is $k_{offset}1$, the timing offset variation is $\Delta k$, and the update rule indicated by the first indication information is increasing the value of the timing offset. The terminal device may update the value of the timing offset parameter from $k_{offset}1$ to $k_{offset}1+\Delta k$, and then update the value of the timing offset parameter from $k_{offset}1+\Delta k$ to $k_{offset}1-\Delta k-\Delta k$, until the terminal device stops updating the value of the timing offset parameter.

Optionally, the terminal device further receives the second information sent by the network device, and updates the value of the timing offset parameter based on the second information.

Specifically, for specific descriptions of updating the value of the timing offset parameter by the terminal device based on the second information, refer to the descriptions of the second information in step 301. Details are not described again.

Optionally, the terminal device further receives the third indication information sent by the network device, and starts to update the value of the timing offset parameter immediately or after a preset time length based on the third indication information. The third indication information indicates the terminal device to update the value of the timing offset parameter.

Specifically, for specific descriptions of updating the value of the timing offset parameter by the terminal device based on the third indication information, refer to the descriptions of the third indication information in step 301. Details are not described again.

Optionally, the terminal device further receives the second indication information sent by the network device, and stops updating the value of the timing offset parameter immediately or after a preset time length based on the second indication information. The second indication information indicates the terminal device to stop updating the value of the timing offset parameter. The preset time length may be a time length pre-agreed upon by the terminal device and the network device, or a time length configured by the network device for the terminal device.

Specifically, for specific descriptions of stopping updating the value of the timing offset parameter by the terminal device based on the second indication information, refer to the descriptions of the second indication information in step 301. Details are not described again.

Optionally, when the first indication information includes the second reference value or the difference between the second reference value and the first reference value, the terminal device may determine whether an absolute value of a difference between the updated value of the timing offset parameter and the second reference value is less than or equal to a first threshold; and if the absolute value of the difference between the updated value of the timing offset parameter and the second reference value is less than or equal to the first threshold, stop updating the value of the timing offset parameter. Optionally, the first threshold is 0.

Further, after the absolute value of the difference between the updated value of the timing offset parameter and the second reference value is less than or equal to the first threshold, the terminal device may further update the updated value of the timing offset parameter based on the timing offset variation until an absolute value of a difference between an updated value of the timing offset parameter and the first reference value is less than or equal to a second threshold. To be specific, the terminal device updates the value of the timing offset parameter from the first reference value to the second reference value based on the timing offset variation, and then updates the value of the timing offset parameter from the second reference value to the first reference value. Optionally, the second threshold is 0.

Optionally, the terminal device sends, to the network device, fourth indication information indicating to update the value of the timing offset parameter, so that the network device updates, based on the fourth indication information, the value of the timing offset parameter corresponding to the terminal device.

For example, when the terminal device needs to update the value of the timing offset parameter, the terminal device may send an update acknowledgment instruction (for example, an ACK) to the network device, to indicate the network device and the terminal device to update the value of the timing offset parameter corresponding to the terminal device after a preset time length from a time point at which the network device receives the update acknowledgment instruction or receives the update acknowledgment instruction.

Further, when the network device sends the same first information to the terminal device located in the same area, for example, the terminal device is located in a first area, the terminal device may receive first information that is corresponding to the first area and that is sent by the network device. When the terminal device hands over from the first area to a second area, the terminal device may receive first information that is corresponding to the second area and that is sent by the network device.

The first area may be a coverage area of a first beam, a first cell, or a first terminal device group, and the second area may be a coverage area of a second beam, a second cell, or a second terminal device group.

Specifically, in the communication protocol, different beams/cells may be distinguished between based on a bandwidth part (BWP), a transmission configuration indication (transmission configuration indicator, TCI), or a synchronization signal block (SSB). In other words, different beams/cells may be indicated based on a BWP, a TCI, or an SSB. Therefore, beam/cell handover may be indicated between the terminal and the network device by handover of the BWP, the TCI, or the SSB.

It should be noted that, that the terminal device hands over from the first area to the second area may also be described as that the terminal device hands over from a serving BWP to a target BWP, from a serving TCI to a target TCI, or from a serving SSB to a target SSB. This is not limited.

For example, the terminal device hands over from the serving BWP to the target BWP. If the target BWP is an initial BWP, the network device may send, by using RRC signaling, first information corresponding to the initial BWP to the terminal device. If the target BWP is a non-initial BWP, the network device may send, by using BWP downlink common signaling (BWP-downlink common) or BWP uplink common signaling (BWP-uplink common), first information corresponding to the non-initial BWP to the terminal device.

It should be noted that if the terminal device triggers a measurement procedure before initiating the handover, the network device may send, by using corresponding RRC signaling in neighboring cell measurement configuration and handover, the first information corresponding to the target BWP to the terminal device. For example, the first information is delivered by using measurement configuration (MeasConfig) signaling in RRC. In a handover procedure, the network device may further send, to the terminal device in the serving BWP by using an RRC reconfiguration message, the first information to be used by the terminal device in the target BWP.

It should be noted that when the terminal device hands over from the first area to the second area, the network device may send the first information corresponding to the second area to the terminal device, and may also send second information corresponding to the second area to the terminal device. This is not limited.

When the terminal device hands over from the first area to the second area, the network device sends the first information corresponding to the second area to the terminal device, so that after the terminal device hands over to the second area, the terminal device can determine the value of the timing offset parameter based on the first information corresponding to the second area, and update the timing offset parameter by using the first information, thereby ensuring continuity of the communication system.

Further, in the method shown in FIG. 3, the terminal device and the network device may use different granularities to represent the value of the timing offset parameter.

For example, the value of the timing offset parameter may be divided by a slot length, to represent the value of the timing offset parameter by using a slot granularity; or the value of the timing offset parameter may be divided by a subframe length, to represent the value of the timing offset parameter by using a subframe granularity; or the value of the timing offset parameter may be represented by using another granularity such as a second granularity, a millisecond granularity, a frame granularity, or a symbol granularity. This is not limited.

Further, the terminal device and the network device may round up or round down the value of the timing offset parameter, to represent the value of the timing offset parameter in an integer form.

For example, the terminal device may further adjust the value of the timing offset parameter based on the first magnitude after rounding up or rounding down the value of the timing offset parameter. This is not limited.

Further, a unit of a time-related parameter such as the first reference value, the second reference value, the timing offset variation, the update interval, and the preset time length may be a second, a millisecond, a slot length, a subframe length, a frame length, or a combination of a plurality of time units. Different time units may be used for different parameters. This is not limited.

Based on the method shown in FIG. 3, the terminal device may automatically update the value of the timing offset parameter according to the update rule of the timing offset parameter indicated by the first indication information and based on the first reference value and the timing offset variation, and the network device does not need to continuously update the value of the timing offset parameter and deliver the value to the terminal device by using signaling. Therefore, signaling overheads of the network device are reduced.

For example, the network device sends the value of the timing offset parameter to the terminal device by using MAC CE signaling, and each MAC CE signaling occupies eight bits. It is assumed that the value of the timing offset parameter corresponding to the terminal device needs to be updated for 20 times. If the network device updates the value of the timing offset parameter corresponding to the terminal device, 8*20=160 bits are required. If the method provided in this embodiment of this application is used, the network device sends the first information to the terminal device once, and the terminal device may automatically update the value of the timing offset parameter based on the first information, to reduce signaling overheads of the network device.

Based on the method shown in FIG. 3, the terminal device may update, by using the method shown in FIG. 3, the timing offset parameter corresponding to the terminal device. In addition, the network device may synchronously update, by using a same mechanism as the terminal device, the timing offset parameter corresponding to the terminal device, to ensure that the value of the timing offset parameter determined on the network device side is consistent with the value of the timing offset parameter determined on the terminal device side, thereby improving reliability of the communication system.

Specifically, for specific descriptions of updating the value of the timing offset parameter corresponding to the terminal device by the network device, refer to the foregoing specific descriptions of updating the value of the timing offset parameter by the terminal device. Details are not described again.

Based on the method shown in FIG. 3, the network device and the terminal device may synchronously update, based on the first information and the timing offset variation, the value of the timing offset parameter corresponding to the terminal device. As shown in FIG. 5, the terminal device and the network device may further update, based on a third reference value corresponding to the reference point in the area corresponding to the terminal device, the value of the timing offset parameter corresponding to the terminal device.

FIG. 5 is a flowchart of a timing offset parameter update method according to an embodiment of this application. As shown in FIG. 5, the method may include the following steps.

Step 501: A terminal device and a network device obtain first location information and second location information.

The first location information indicates a location of a reference point, and the second location information indicates a location of the network device. For the reference point, refer to the descriptions of the reference point in FIG. 3. Details are not described again.

Specifically, the terminal device may receive the first location information and the second location information that are sent by the network device.

Step 502: The terminal device and the network device determine a third reference value based on the first location information and the second location information.

Specifically, the terminal device and the network device may determine, based on the first location information and the second location information, a round trip delay corresponding to the reference point, and determine the third reference value based on the round trip delay.

For the round trip delay corresponding to the reference point, refer to the foregoing descriptions of the round trip delay corresponding to the terminal device in FIG. 3. Details are not described again.

Specifically, the terminal device and the network device may determine, based on the round trip delay corresponding to the reference point, a difference between the round trip delay corresponding to the reference point and a timing compensation value corresponding to the reference point as the third reference value, that is, third reference value=RTD (reference point, network device)-timing compensation value. RTD (reference point, network device) indicates a round trip delay between the reference point and the network device. Alternatively, the timing compensation value is not considered, that is, third reference value=RTD (reference point, network device).

Step 503: The terminal device and the network device determine whether an absolute value of a difference between the third reference value and a value of a timing offset parameter currently used by the terminal device is greater than or equal to a timing offset variation.

Specifically, the terminal device may report, to the network device, the value of the timing offset parameter currently used by the terminal device.

Specifically, the terminal device and the network device may perform quantization processing and/or rounding up/down on the third reference value and the value of the timing offset parameter currently used by the terminal device by using a same time unit, and then determine whether the absolute value of the difference between the third reference value and the value of the timing offset parameter currently used by the terminal device is greater than or equal to the timing offset variation.

Step 504: If the absolute value of the difference between the third reference value and the value of the timing offset parameter currently used by the terminal device is greater than or equal to the timing offset variation, the terminal device and the network device update the value of the timing offset parameter corresponding to the terminal device to the third reference value.

Based on the method shown in FIG. 5, the terminal device and the network device may determine the third reference value based on the location of the reference point and the location of the network device, compare the third reference value with the value of the timing offset parameter currently used by the terminal device, and automatically update the value of the timing offset parameter based on a comparison result. The network device does not need to continuously update the value of the timing offset parameter and deliver the value to the terminal device by using signaling. Therefore, signaling overheads of the network device are reduced.

Based on the methods in FIG. 3 and FIG. 5, the network device and the terminal device may update, based on the first information and the timing offset variation, the value of the timing offset parameter corresponding to the terminal device, or update, based on the third reference value corresponding to the reference point in the area corresponding to the terminal device, the value of the timing offset parameter corresponding to the terminal device. As shown in FIG. 6, the network device and the terminal device may alternatively update, based on the area corresponding to the terminal device, the value of the timing offset parameter corresponding to the terminal device.

In a possible design, the network device sends, to the terminal device, a change curve indicating that a timing advance adjustment amount changes with time, and the terminal device and the network device determine the value of the timing offset parameter based on the change curve.

The change curve indicating that the timing advance adjustment amount changes with time may be a fitting curve. It may be understood that, in addition to the change curve of the timing advance adjustment amount, another change curve with time may also be used to determine the value of the timing offset parameter. This is not limited herein.

For example, the network device may send a coefficient of a timing advance adjustment amount change function to the terminal device in a unicast, multicast, or broadcast manner, so that the terminal device generates the timing advance adjustment amount change function based on the coefficient.

Specifically, the timing advance adjustment amount change function generated by the terminal device based on the coefficient of the timing advance adjustment amount change function may be $Y=a*x^4+b*x^3+c*x^2+d*x+e$.

For example, the network device may send five coefficients of a unary quadratic polynomial function to the terminal device, where the five coefficients are respectively a=1.15e-16; b=-1.199e-12; c=4.779e-09; d=-9.566e-0; e=0.01234. In this case, the timing advance adjustment amount change function generated by the terminal device is: $Y=1.15e-16e-16*x^4+(-1.199e-12)*x^3+4.779e-09*x^2+(-9.566e-06)*x+0.01234$.

Optionally, the network device sends start time t0 of the timing advance adjustment amount change function to the terminal device, so that the terminal device substitutes the start time t0 into the timing advance adjustment amount change function generated by the terminal device, to calculate a change of the timing advance adjustment amount.

Optionally, the terminal device determines, based on ephemeris information of the network device, time at which the network device sends the coefficient of the timing advance adjustment amount change function, uses the time as start time or adds an increment to the time as start time, and substitutes the start time into the timing advance adjustment amount change function generated by the terminal device, to calculate a change of the timing advance adjustment amount.

The ephemeris information includes time at which the network device sends the coefficient of the timing advance adjustment amount change function.

Optionally, the terminal device uses, as start time, time at which the coefficient of the timing advance adjustment amount change function sent by the network device is received, and substitutes the start time into the timing advance adjustment amount change function generated by the terminal device, to calculate a change of the timing advance adjustment amount.

For example, the terminal device and the network device may obtain a calculation value ($k_{offset\_cal}$) of the timing offset parameter based on a TA value of a timing advance adjustment amount change curve at a moment (a moment determined based on UTC time or a moment determined based on relative time of a communication system, for example, determined based on a time axis of a downlink signal) by substituting the TA value into the foregoing formula for calculating the value of the timing offset parameter. For example, calculation value of the timing offset parameter=TA/slot length.

The terminal device and the network device may determine whether an absolute value of a difference between the calculation value of the timing offset parameter and the currently used value of the timing offset parameter corresponding to the terminal device is greater than or equal to the timing offset variation. If the absolute value of the difference between the calculation value of the timing offset parameter and the currently used value of the timing offset parameter corresponding to the terminal device is greater than or equal to the timing offset variation, the terminal device and the network device update the value of the timing offset parameter corresponding to the terminal device to the calculation value of the timing offset parameter.

It should be noted that the calculation value of the timing offset parameter may be rounded up or rounded down, to represent the calculation value of the timing offset parameter in an integer form. The slot length may be a slot length of an uplink signal, or may be a slot length of a downlink signal. The calculation value of the timing offset parameter is calculated by using the slot length as an example. In actual use, the calculation value of the timing offset parameter may be calculated by using another time unit, for example, 0.5 ms, 1 ms, a symbol length, a subframe length, or a frame length. This is not limited.

Optionally, the terminal device calculates the calculation value of the timing offset parameter based on a TA value of corresponding time on the timing advance adjustment amount change curve, and the terminal device determines whether the absolute value of the difference between the calculation value of the timing offset parameter and the currently used value of the timing offset parameter is greater than or equal to the timing offset variation. If the absolute value of the difference between the calculation value of the timing offset parameter and the currently used value of the timing offset parameter is greater than or equal to the timing offset variation, the terminal device sends an update acknowledgment instruction (for example, an ACK) to the network device, to indicate the network device and the terminal device to update the value of the timing offset parameter corresponding to the terminal device to the calculation value of the timing offset parameter after a preset time length from a time point at which the network device receives the update acknowledgment instruction or receives the update acknowledgment instruction. The network device also obtains the calculation value of the timing offset parameter based on the TA value of the corresponding time on the timing advance adjustment amount change curve.

Optionally, the network device calculates the calculation value of the timing offset parameter based on a TA value of corresponding time on the timing advance adjustment amount change curve, and the network device determines whether the absolute value of the difference between the calculation value of the timing offset parameter and the currently used value of the timing offset parameter is greater than or equal to the timing offset variation. If the absolute value of the difference between the calculation value of the timing offset parameter and the currently used value of the timing offset parameter is greater than or equal to the timing offset variation, the network device sends an update acknowledgment instruction (for example, an ACK) to the terminal device, to indicate the network device and the terminal device to update the value of the timing offset parameter corresponding to the terminal device to the calculation value of the timing offset parameter after a preset time length from a time point at which the terminal device receives the update acknowledgment instruction or receives the update acknowledgment instruction. The terminal device also obtains the calculation value of the timing offset parameter based on the TA value of the corresponding time on the timing advance adjustment amount change curve.

FIG. 6 is a flowchart of a timing offset parameter update method according to an embodiment of this application. As shown in FIG. 6, the method may include the following steps.

Step 601: A terminal device and a network device determine third information.

The third information includes a mapping relationship between a value of a timing offset parameter and an area, and the area is a coverage area of a beam, a cell, or a terminal device group.

Specifically, the network device may determine different values of the timing offset parameter for different areas, and send the mapping relationship between the value of the timing offset parameter and the area to the terminal device.

For example, the mapping relationship between the value of the timing offset parameter and the area includes one or more of the following: a correspondence between a value of the timing offset parameter and a synchronization signal block SSB number shown in Table 1, a mapping relationship between a value of the timing offset parameter and a bandwidth part BWP number shown in Table 2, or a mapping relationship between a value of the timing offset parameter and a transmission configuration indicator TCI number shown in Table 3.

TABLE 1

| SSB number | Value of a timing offset parameter |
|---|---|
| SSB 0 | $k_{offset}1$ |
| SSB 1 | $k_{offset}2$ |
| SSB 2 | $k_{offset}3$ |
| SSB 3 | $k_{offset}4$ |
| SSB 4 | $k_{offset}5$ |
| SSB 5 | $k_{offset}6$ |
| SSB 6 | $k_{offset}7$ |
| SSB 7 | $k_{offset}8$ |

TABLE 2

| BWP number | Value of a timing offset parameter |
|---|---|
| BWP 0 | $k_{offset}1$ |
| BWP 1 | $k_{offset}2$ |
| BWP 2 | $k_{offset}3$ |
| BWP 3 | $k_{offset}4$ |
| BWP 4 | $k_{offset}5$ |

TABLE 3

| TCI index number | Value of a timing offset parameter |
|---|---|
| 0 | $k_{offset}1$ |
| 1 | $k_{offset}2$ |
| 2 | $k_{offset}3$ |
| 3 | $k_{offset}4$ |
| 4 | $k_{offset}5$ |
| 5 | $k_{offset}6$ |
| 6 | $k_{offset}7$ |
| 7 | $k_{offset}8$ |

Step 602: The terminal device and the network device determine the value of the timing offset parameter based on the mapping relationship and an area corresponding to the terminal device.

Based on the method shown in FIG. 6, the terminal device may automatically update the value of the timing offset parameter based on the third information and the area in which the terminal device is currently located, and the network device does not need to continuously update the value of the timing offset parameter and deliver the value to the terminal device by using signaling. Therefore, signaling overheads of the network device are reduced.

In addition, because a round trip delay corresponding to the terminal device in an NTN communication system is large, a time length of a timer in the terminal device and the network device may be less than the round trip delay, and the terminal device and the network device cannot communicate with each other based on the timer.

Based on this, the terminal device and the network device may determine and update the value of the timing offset parameter based on the round trip delay corresponding to the terminal device in a manner similar to that in FIG. 3 to FIG.

6, and adjust, based on an original time length of the timer, the time length of the timer to a sum of the original time length and a time length indicated by the value of the timing offset parameter. Alternatively, the terminal device and the network device may delay starting the timer based on the time length indicated by the value of the timing offset parameter, to ensure that the terminal device and the network device can communicate with each other based on the timer, thereby improving reliability of a communication system.

For example, the timer may include a discontinuous reception HARQ round trip time timer downlink (drx-HARQ-RTT-TimerDL), a discontinuous reception HARQ round trip time timer uplink (drx-HARQ-RTT-TimerUL), a random access contention resolution timer (ra-contention resolution timer), a scheduling request prohibit timer (sr-prohibit timer), a reassembly timer (t-reassembly), a discard timer, a receive window length (ra-response window) for receiving a RAR (random access response) signal, and the like. This is no limited.

Specifically, the terminal device and the network device determine and update the value of the timing offset parameter by using a same mechanism, so that it can be ensured that the terminal device and the network device communicate with each other by using a same timer, thereby improving reliability of the communication system.

The foregoing mainly describes the solutions provided in embodiments of this application from a perspective of interaction between the devices. It may be understood that to implement the foregoing functions, the devices include hardware structures and/or software modules corresponding to the functions. A person skilled in the art should easily be aware that, in combination with algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of each device may be obtained through division according to the foregoing method example. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division during actual implementation.

When each functional module is obtained through division based on each corresponding function, FIG. 7 shows a terminal device. A terminal device 70 may include a transceiver module 701 and a processing module 702. For example, the terminal device 70 may be a terminal device, or may be a chip used in the terminal device or another combined device or component that has a function of the terminal device. When the terminal device 70 is a terminal device, the transceiver module 701 may be a transceiver, where the transceiver may include an antenna, a radio frequency circuit, and the like; and the processing module 702 may be a processor (or a processing circuit), for example, a baseband processor, where the baseband processor may include one or more CPUs. When the terminal device 70 is a component that has a function of the terminal device, the transceiver module 701 may be a radio frequency unit, and the processing module 702 may be a processor (or a processing circuit), for example, a baseband processor. When the terminal device 70 is a chip system, the transceiver module 701 may be an input/output interface of a chip (for example, a baseband chip), and the processing module 702 may be a processor (or a processing circuit) of the chip system, and may include one or more central processing units. It should be understood that the transceiver module 701 in this embodiment of this application may be implemented by a transceiver or a transceiver-related circuit component, and the processing module 702 may be implemented by a processor or a processor-related circuit component (also referred to as a processing circuit).

For example, the transceiver module 701 may be configured to perform all sending and receiving operations performed by the terminal device in the embodiments shown in FIG. 3 to FIG. 6, and/or configured to support another process of the technology described in this specification. The processing module 702 may be configured to perform all operations other than the sending and receiving operations performed by the terminal device in the embodiments shown in FIG. 3 to FIG. 6, and/or configured to support another process of the technology described in this specification.

Specifically, the transceiver module 701 is configured to obtain first information that includes a first reference value and first indication information, where the first indication information indicates an update rule of a timing offset parameter, and the first reference value is an initial value of the timing offset parameter.

The processing module 702 is configured to update a value of the timing offset parameter based on the first information and a timing offset variation, to obtain an updated value of the timing offset parameter, where an absolute value of the timing offset variation is equal to an absolute value of a difference between any two consecutively updated values of the timing offset parameter.

In a possible design, the first indication information includes the update rule, and the update rule includes at least one of the following: increasing the value of the timing offset parameter, or decreasing the value of the timing offset parameter; the first indication information includes a second reference value, and when the second reference value is greater than the first reference value, the first indication information indicates to increase the value of the timing offset parameter; or when the second reference value is less than the first reference value, the first indication information indicates to decrease the value of the timing offset parameter; or the first indication information includes a difference between a second reference value and the first reference value, and when the second reference value is greater than the first reference value, the first indication information indicates to increase the value of the timing offset parameter; or when the second reference value is less than the first reference value, the first indication information indicates to decrease the value of the timing offset parameter.

In a possible design, the transceiver module 701 is further configured to obtain second information, where the second information includes one or more of the following: a first moment, an update interval, an update moment, or a quantity of update times, the first moment indicates a moment at which the terminal device starts to update the value of the timing offset parameter, the update interval indicates a time interval between any two consecutive times of updating the value of the timing offset parameter by the terminal device, the update moment indicates a start moment at which the terminal device updates the value of the timing offset parameter, and the quantity of update times indicates a quantity of times that the terminal device updates the value of the timing offset parameter.

In a possible design, the transceiver module 701 is further configured to obtain second indication information indicating the terminal device to stop updating the value of the timing offset parameter, and the processing module 702 is further configured to stop updating the value of the timing offset parameter based on the second indication information.

In a possible design, when the first indication information includes the second reference value or the difference between the second reference value and the first reference value, the processing module 702 is further configured to: determine whether an absolute value of a difference between the updated value of the timing offset parameter and the second reference value is less than or equal to a first threshold; and if the absolute value of the difference between the updated value of the timing offset parameter and the second reference value is less than or equal to the first threshold, stop updating the value of the timing offset parameter.

In a possible design, the processing module 702 is further configured to: after the absolute value of the difference between the updated value of the timing offset parameter and the second reference value is less than or equal to the first threshold, update the updated value of the timing offset parameter based on the timing offset variation until an absolute value of a difference between an updated value of the timing offset parameter and the first reference value is less than or equal to a second threshold.

In a possible design, the transceiver module 701 is further configured to obtain third indication information indicating the terminal device to update the value of the timing offset parameter, and the processing module 702 is further configured to update the value of the timing offset parameter based on the third indication information.

In a possible design, the transceiver module 701 is configured to send, to a network device, fourth indication information indicating to update the value of the timing offset parameter, so that the network device updates, based on the fourth indication information, the value of the timing offset parameter corresponding to the terminal device.

In a possible design, when the terminal device is located in a first area, the transceiver module 701 is further configured to obtain first information corresponding to the first area; and when the terminal device hands over from the first area to a second area, the transceiver module 701 is further configured to obtain first information corresponding to the second area, where the first area is a coverage area of a first beam, a first cell, or a first terminal device group, and the second area is a coverage area of a second beam, a second cell, or a second terminal device group.

In another possible implementation, the transceiver module 701 and the processing module 702 in the terminal device 70 shown in FIG. 7 may be further configured to perform the following operations.

The transceiver module 701 is configured to obtain first location information and second location information, where the first location information indicates a location of a reference point, and the second location information indicates a location of a network device.

The processing module 702 is configured to determine a third reference value based on the first location information and the second location information.

The processing module 702 is further configured to: determine whether an absolute value of a difference between the third reference value and a value of a timing offset parameter currently used by the terminal device is greater than or equal to a timing offset variation; and if the absolute value of the difference between the third reference value and the value of the timing offset parameter currently used by the terminal device is greater than or equal to the timing offset variation, the terminal device updates the value of the timing offset parameter to the third reference value.

In a possible design, the processing module 702 is further configured to determine, based on the first location information and the second location information, a round trip delay corresponding to the reference point, where the round trip delay is a quotient of twice a distance between the reference point and the network device and a transmission speed; and the terminal device determines the third reference value based on the round trip delay.

In another possible implementation, the transceiver module 701 and the processing module 702 in the terminal device 70 shown in FIG. 7 may be further configured to perform the following operations.

The transceiver module 701 is configured to obtain third information including a mapping relationship between a value of a timing offset parameter and an area, where the area is a coverage area of a beam, a cell, or a terminal device group.

The processing module 702 is configured to determine the value of the timing offset parameter based on the mapping relationship and an area corresponding to the terminal device.

In a possible design, the mapping relationship between the value of the timing offset parameter and the area includes one or more of the following: a correspondence between a value of the timing offset parameter and a synchronization signal block SSB number, a mapping relationship between a value of the timing offset parameter and a bandwidth part BWP number, or a mapping relationship between a value of the timing offset parameter and a transmission configuration indicator TCI number.

In still another possible implementation, the transceiver module 701 in FIG. 7 may be replaced with a transceiver, and a function of the transceiver module 701 may be integrated into the transceiver. The processing module 702 may be replaced with a processor, and a function of the processing module 702 may be integrated into the processor. Further, the terminal device 70 shown in FIG. 7 may further include a memory. When the transceiver module 701 is replaced with the transceiver, and the processing module 702 is replaced with the processor, the terminal device 70 in this embodiment of this application may be the communication apparatus shown in FIG. 2.

When each functional module is obtained through division based on each corresponding function, FIG. 8 shows a network device. A network device 80 may include a processing module 801 and a transceiver module 802. For example, the network device 80 may be a network device, or may be a chip used in the network device or another combined device or component that has a function of the network device. When the network device 80 is a network device, the transceiver module 802 may be a transceiver, where the transceiver may include an antenna, a radio frequency circuit, and the like; and the processing module 801 may be a processor (or a processing circuit), for example, a baseband processor, where the baseband processor may include one or more CPUs. When the network device 80 is a component that has a function of the network device, the transceiver module 802 may be a radio frequency unit, and the processing module 801 may be a processor (or a processing circuit), for example, a baseband processor. When the network device 80 is a chip system, the transceiver module 802 may be an input/output interface of a chip (for example, a baseband chip), and the processing module 801 may be a processor (or a processing circuit) of the chip system, and may include one or more central processing units. It should be understood that the transceiver module 802 in this embodiment of this application may be implemented by a transceiver or a transceiver-related circuit component, and the processing module 801 may be implemented by a processor or a processor-related circuit component (also referred to as a processing circuit).

For example, the processing module 801 may be configured to perform all operations other than the sending and receiving operations performed by the network device in the embodiments shown in FIG. 3 to FIG. 6, and/or configured to support another process of the technology described in this specification. The transceiver module 802 may be configured to perform all sending and receiving operations performed by the network device in the embodiments shown in FIG. 3 to FIG. 6, and/or configured to support another process of the technology described in this specification.

Specifically, the processing module 801 is configured to determine first information; and the transceiver module 802 is configured to send the first information that includes a first reference value and first indication information to a terminal device, so that the terminal device updates a value of a timing offset parameter based on the first information and a timing offset variation, to obtain an updated value of the timing offset parameter, where the first indication information indicates an update rule of the timing offset parameter, the first reference value is an initial value of the timing offset parameter, and an absolute value of the timing offset variation is equal to an absolute value of a difference between any two consecutively updated values of the timing offset parameter.

In a possible design, the first indication information includes the update rule, and the update rule includes at least one of the following: increasing the value of the timing offset parameter, or decreasing the value of the timing offset parameter; the first indication information includes a second reference value, and when the second reference value is greater than the first reference value, the first indication information indicates to increase the value of the timing offset parameter; or when the second reference value is less than the first reference value, the first indication information indicates to decrease the value of the timing offset parameter; or the first indication information includes a difference between a second reference value and the first reference value, and when the second reference value is greater than the first reference value, the first indication information indicates to increase the value of the timing offset parameter; or when the second reference value is less than the first reference value, the first indication information indicates to decrease the value of the timing offset parameter.

In a possible design, the processing module 801 is configured to update, based on the first information and the timing offset variation, the value of the timing offset parameter corresponding to the terminal device.

In a possible design, the transceiver module 802 is further configured to send second information to the terminal device, where the second information includes one or more of the following: a first moment, an update interval, an update moment, or a quantity of update times, the first moment indicates a moment at which the terminal device starts to update the value of the timing offset parameter, the update interval indicates a time interval between any two consecutive times of updating the value of the timing offset parameter by the terminal device, the update moment indicates a start moment at which the terminal device updates the value of the timing offset parameter, and the quantity of update times indicates a quantity of times that the terminal device updates the value of the timing offset parameter.

In a possible design, the processing module 801 is further configured to update, based on the second information, the value of the timing offset parameter corresponding to the terminal device.

In a possible design, the transceiver module 802 is further configured to send second indication information to the terminal device, where the second indication information indicates the terminal device to stop updating the value of the timing offset parameter.

In a possible design, when the first indication information includes the second reference value or the difference between the second reference value and the first reference value, the processing module 801 is further configured to: determine whether an absolute value of a difference between the updated value of the timing offset parameter and the second reference value is less than or equal to a first threshold; and if the absolute value of the difference between the updated value of the timing offset parameter and the second reference value is less than or equal to the first threshold, stop updating the value of the timing offset parameter corresponding to the terminal device.

In a possible design, the processing module 801 is further configured to: after the absolute value of the difference between the updated value of the timing offset parameter corresponding to the terminal device and the second reference value is less than or equal to the first threshold, update, based on the timing offset variation, the updated value of the timing offset parameter corresponding to the terminal device until an absolute value of a difference between an updated value of the timing offset parameter corresponding to the terminal device and the first reference value is less than or equal to a second threshold.

In a possible design, the transceiver module 802 is further configured to send, to the terminal device, third indication information indicating the terminal device to update the value of the timing offset parameter.

In a possible design, the transceiver module 802 is configured to: receive, from the terminal device, fourth indication information indicating to update the value of the timing offset parameter; and the network device updates, based on the fourth indication information, the value of the timing offset parameter corresponding to the terminal device.

In a possible design, when the terminal device is located in a first area, the transceiver module 802 is further configured to send first information corresponding to the first area to the terminal device, where the first area is a coverage area of a first beam, a first cell, or a first terminal device group; and when the terminal device hands over from the first area to a second area, the transceiver module 802 is further configured to send first information corresponding to the second area to the terminal device, where the second area is a coverage area of a second beam, a second cell, or a second terminal device group.

In another possible implementation, the processing module 801 and the transceiver module 802 in the network device 80 shown in FIG. 8 may be further configured to perform the following operations.

The processing module 801 is configured to determine first location information and second location information.

The transceiver module 802 is configured to send the first location information and the second location information to a terminal device, so that the terminal device determines a third reference value based on the first location information and the second location information, and determines whether an absolute value of a difference between the third reference value and a value of a timing offset parameter currently used by the terminal device is greater than or equal to a timing offset variation; and if the absolute value of the difference between the third reference value and the value of the timing offset parameter currently used by the terminal device is greater than or equal to the timing offset variation, the terminal device updates the value of the timing offset parameter to the third reference value, where the first location information indicates a location of a reference point, and the second location information indicates a location of the network device.

In a possible design, the processing module 801 is configured to determine the third reference value based on the first location information and the second location information. The processing module 801 is further configured to: determine whether the absolute value of the difference between the third reference value and the value of the timing offset parameter currently used by the terminal device is greater than or equal to the timing offset variation; and if the absolute value of the difference between the third reference value and the value of the timing offset parameter currently used by the terminal device is greater than or equal to the timing offset variation, update the value of the timing offset parameter corresponding to the terminal device to the third reference value.

In a possible design, the processing module 801 is further configured to determine, based on the first location information and the second location information, a round trip delay corresponding to the reference point, where the round trip delay is a quotient of twice a distance between the reference point and the network device and a transmission speed; and the processing module is further configured to determine the third reference value based on the round trip delay.

In another possible implementation, the processing module 801 and the transceiver module 802 in the network device 80 shown in FIG. 8 may be further configured to perform the following operations.

The processing module 801 is configured to determine third information. The transceiver module 802 is configured to send, to a terminal device, the third information including a mapping relationship between a value of a timing offset parameter and an area, so that the terminal device determines the value of the timing offset parameter based on the mapping relationship and an area corresponding to the terminal device, where the area is a coverage area of a beam, a cell, or a terminal device group.

In a possible design, the processing module 801 is configured to determine, based on the third information and the area corresponding to the terminal device, the value of the timing offset parameter corresponding to the terminal device.

In a possible design, the mapping relationship between the value of the timing offset parameter and the area includes one or more of the following: a correspondence between a value of the timing offset parameter and a synchronization signal block SSB number, a mapping relationship between a value of the timing offset parameter and a bandwidth part BWP number, or a mapping relationship between a value of the timing offset parameter and a transmission configuration indicator TCI number.

In still another possible implementation, the transceiver module 802 in FIG. 8 may be replaced with a transceiver, and a function of the transceiver module 802 may be integrated into the transceiver. The processing module 801 may be replaced with a processor, and a function of the processing module 801 may be integrated into the processor. Further, the network device 80 shown in FIG. 8 may further include a memory. When the transceiver module 802 is replaced with the transceiver, and the processing module 801 is replaced with the processor, the network device 80 in this embodiment of this application may be the communication apparatus shown in FIG. 2.

Embodiments of this application further provide a computer-readable storage medium. All or some of the procedures in the foregoing method embodiments may be implemented by a computer program instructing related hardware. The program may be stored in the computer-readable storage medium. When the program is executed, the procedures of the foregoing method embodiments may be included. The computer-readable storage medium may be an internal storage unit of the terminal (including a data transmitting end and/or a data receiving end) in any one of the foregoing embodiments, for example, a hard disk drive or a memory of the terminal. Alternatively, the computer-readable storage medium may be an external storage device of the terminal, for example, a plug-in hard disk drive, a smart media card (SMC), a secure digital (SD) card, a flash card, or the like that are configured on the terminal. Further, the computer-readable storage medium may alternatively include both of the internal storage unit of the terminal and the external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, the terms "include", "have", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

Based on the foregoing descriptions of the implementations, a person skilled in the art may clearly understand that for the purpose of convenient and brief description, division into the foregoing functional modules is merely used as an example for description. During actual application, the foregoing functions can be allocated to different functional modules for implementation based on a requirement, in other words, an inner structure of an apparatus is divided into different functional modules to implement all or a part of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of steps of methods in embodiments of this application. The foregoing storage medium includes any medium that can store program code, such as a USB flash drive, a removable hard disk, a ROM, a RAM, a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A timing offset parameter update method comprising:
   obtaining, by a terminal device, first information, wherein the first information comprises a first reference value and first indication information, the first indication information indicates an update rule of a timing offset parameter, and the first reference value is an initial value of the timing offset parameter; and
   updating, by the terminal device, a value of the timing offset parameter based on the first information and a timing offset variation, to obtain an updated value of the timing offset parameter, wherein an absolute value of the timing offset variation is equal to an absolute value of a difference between any two consecutively updated values of the timing offset parameter.

2. The method according to claim 1, wherein
   the first indication information comprises the update rule, and the update rule comprises at least one of the following: increasing the value of the timing offset parameter, or decreasing the value of the timing offset parameter;
   the first indication information comprises a second reference value, and based on the second reference value being greater than the first reference value, the first indication information indicates to increase the value of the timing offset parameter; or based on the second reference value being less than the first reference value, the first indication information indicates to decrease the value of the timing offset parameter; or
   the first indication information comprises a difference between a second reference value and the first reference value, and based on the second reference value being greater than the first reference value, the first indication information indicates to increase the value of the timing offset parameter; or based on the second reference value being less than the first reference value, the first indication information indicates to decrease the value of the timing offset parameter.

3. The method according to claim 1, wherein
   obtaining, by the terminal device, second information, wherein the second information comprises one or more of the following: a first moment, an update interval, an update moment, or a quantity of update times,
   wherein the first moment indicates a moment at which the terminal device starts to update the value of the timing offset parameter,
   wherein the update interval indicates a time interval between any two consecutive times of updating the value of the timing offset parameter by the terminal device,
   wherein the update moment indicates a start moment at which the terminal device updates the value of the timing offset parameter, and
   wherein the quantity of update times indicates a quantity of times that the terminal device updates the value of the timing offset parameter.

4. The method according to claim 1, further comprising:
   obtaining, by the terminal device, second indication information, wherein the second indication information indicates the terminal device to stop updating the value of the timing offset parameter; and
   stopping, by the terminal device based on the second indication information, updating the value of the timing offset parameter.

5. The method according to claim 2, wherein based on when the first indication information comprising the second reference value or the difference between the second reference value and the first reference value, the method further comprises:
   determining, by the terminal device, whether an absolute value of a difference between the updated value of the timing offset parameter and the second reference value is less than or equal to a first threshold; and
   based on the absolute value of the difference between the updated value of the timing offset parameter and the second reference value being less than or equal to the first threshold, stopping updating the value of the timing offset parameter.

6. The method according to claim 5, further comprising:
after the absolute value of the difference between the updated value of the timing offset parameter and the second reference value is less than or equal to the first threshold, updating, by the terminal device, the updated value of the timing offset parameter based on the timing offset variation until an absolute value of a difference between an updated value of the timing offset parameter and the first reference value is less than or equal to a second threshold.

7. The method according to claim 1, wherein the method further comprising:
based on the terminal device being located in a first area, obtaining, by the terminal device, first information corresponding to the first area, wherein the first area is a coverage area of a first beam, a first cell, or a first terminal device group; and
based on the terminal device handing over from the first area to a second area, obtaining, by the terminal device, first information corresponding to the second area, wherein the second area is a coverage area of a second beam, a second cell, or a second terminal device group.

8. A timing offset parameter update method comprising:
obtaining, by a terminal device, first location information and second location information, wherein the first location information indicates a location of a reference point, and the second location information indicates a location of a network device;
determining, by the terminal device, a third reference value based on the first location information and the second location information;
determining, by the terminal device, whether an absolute value of a difference between the third reference value and a value of a timing offset parameter currently used by the terminal device is greater than or equal to a timing offset variation; and
based on the absolute value of the difference between the third reference value and the value of the timing offset parameter currently used by the terminal device being greater than or equal to the timing offset variation, updating, by the terminal device, the value of the timing offset parameter to the third reference value.

9. The method according to claim 8, wherein the determining, by the terminal device, the third reference value based on the first location information and the second location information comprises:
determining, by the terminal device based on the first location information and the second location information, a round trip delay corresponding to the reference point, wherein the round trip delay is a quotient of twice a distance between the reference point and the network device and a transmission speed; and
determining, by the terminal device, the third reference value based on the round trip delay.

10. A terminal device comprising:
a transceiver, configured to cooperate with a processor to obtain first information, wherein the first information comprises a first reference value and first indication information, the first indication information indicates an update rule of a timing offset parameter, and the first reference value is an initial value of the timing offset parameter; and
the processor, configured to update a value of the timing offset parameter based on the first information and a timing offset variation, to obtain an updated value of the timing offset parameter, wherein an absolute value of the timing offset variation is equal to an absolute value of a difference between any two consecutively updated values of the timing offset parameter.

11. The terminal device according to claim 10, wherein
the first indication information comprises the update rule, and the update rule comprises at least one of the following: increasing the value of the timing offset parameter, or decreasing the value of the timing offset parameter;
the first indication information comprises a second reference value, and based on the second reference value being greater than the first reference value, the first indication information indicates to increase the value of the timing offset parameter; or based on the second reference value being less than the first reference value, the first indication information indicates to decrease the value of the timing offset parameter; or
the first indication information comprises a difference between a second reference value and the first reference value, and based on the second reference value being is-greater than the first reference value, the first indication information indicates to increase the value of the timing offset parameter; or based on the second reference value being is-less than the first reference value, the first indication information indicates to decrease the value of the timing offset parameter.

12. The terminal device according to claim 10, wherein
the transceiver is further configured to cooperate with the processor to obtain second information, wherein the second information comprises one or more of the following: a first moment, an update interval, an update moment, or a quantity of update times,
wherein the first moment indicates a moment at which the terminal device starts to update the value of the timing offset parameter,
wherein the update interval indicates a time interval between any two consecutive times of updating the value of the timing offset parameter by the terminal device,
wherein the update moment indicates a start moment at which the terminal device updates the value of the timing offset parameter, and
wherein the quantity of update times indicates a quantity of times that the terminal device updates the value of the timing offset parameter.

13. The terminal device according to claim 10, wherein
the transceiver is further configured to cooperate with the processor to obtain second indication information, wherein the second indication information indicates the process to stop updating the value of the timing offset parameter; and
the processor is further configured to stop updating the value of the timing offset parameter based on the second indication information.

14. The terminal device according to claim 11, wherein
based on the first indication information comprising the second reference value or the difference between the second reference value and the first reference value,
the process or is further configured to: determine whether an absolute value of a difference between the updated value of the timing offset parameter and the second reference value is less than or equal to a first threshold; and
based on the absolute value of the difference between the updated value of the timing offset parameter and the second reference value being less than or equal to the first threshold, stop updating the value of the timing offset parameter.

15. The terminal device according to claim 14, wherein the processor is further configured to: after the absolute value of the difference between the updated value of the timing offset parameter and the second reference value is less than or equal to the first threshold, update the updated value of the timing offset parameter based on the timing offset variation until an absolute value of a difference between an updated value of the timing offset parameter and the first reference value is less than or equal to a second threshold.

16. The terminal device according to claim 10, wherein based on the terminal device being located in a first area, the transceiver is further configured to cooperate with the processor to obtain first information corresponding to the first area, wherein the first area is a coverage area of a first beam, a first cell, or a first terminal device group; and based on the terminal device handing over from the first area to a second area, the transceiver is further configured to cooperate with the processor to obtain first information corresponding to the second area, wherein the second area is a coverage area of a second beam, a second cell, or a second terminal device group.

* * * * *